(12) United States Patent
Mazaika et al.

(10) Patent No.: US 12,157,376 B2
(45) Date of Patent: Dec. 3, 2024

(54) SYSTEMS AND METHODS FOR ADDING A CONTACTOR AT OR NEAR AN MSD

(71) Applicant: COULOMB SOLUTIONS, INC., Livermore, CA (US)

(72) Inventors: David Michael Mazaika, Livermore, CA (US); Lining Zhou, Milpitas, CA (US); Swarup Deshpande, Milpitas, CA (US)

(73) Assignee: COULOMB SOLUTIONS, INC., Livermore, CA (US)

( * ) Notice: Subject to any disclaimer, the term of this patent is extended or adjusted under 35 U.S.C. 154(b) by 0 days.

(21) Appl. No.: 18/073,793

(22) Filed: Dec. 2, 2022

(65) Prior Publication Data

US 2023/0150368 A1    May 18, 2023

Related U.S. Application Data

(63) Continuation of application No. PCT/US2021/059092, filed on Nov. 12, 2021.

(51) Int. Cl.
*B60L 3/00* (2019.01)
*B60L 50/60* (2019.01)
*H01H 71/02* (2006.01)
*H01H 71/08* (2006.01)
*H01M 50/588* (2021.01)
*H01R 13/66* (2006.01)

(52) U.S. Cl.
CPC .......... *B60L 3/0069* (2013.01); *B60L 3/0007* (2013.01); *B60L 50/60* (2019.02); *H01H 71/025* (2013.01); *H01H 71/0264* (2013.01); *H01H 71/08* (2013.01); *H01M 50/588* (2021.01); *H01M 2220/20* (2013.01); *H01R 13/66* (2013.01)

(58) Field of Classification Search
CPC ...... B60L 3/0069; B60L 3/0007; B60L 50/60; B60L 58/10; H01H 71/025; H01H 71/0264; H01H 71/08
See application file for complete search history.

(56) References Cited

U.S. PATENT DOCUMENTS

2008/0143461 A1\* 6/2008 Hastings ................. H02H 7/18
335/7
2015/0183386 A1\* 7/2015 Tieman ................. B60R 25/045
701/2
(Continued)

FOREIGN PATENT DOCUMENTS

CN          203038864 U    7/2013
CN          104795522 A    7/2015
(Continued)

OTHER PUBLICATIONS

European Patent Application No. 21943352.1; Extended Search Report; dated Jun. 26, 2023; 7 pages.
(Continued)

*Primary Examiner* — Livius R. Cazan
(74) *Attorney, Agent, or Firm* — BAKERHOSTETLER LLP

(57) ABSTRACT

A system may be configured to replace a manual service disconnect (MSD). Some embodiments may: provide a set of batteries that include an MSD; remove the MSD; and install a contactor at the MSD. The replacement may be performed via substantially similar housing previously used by the MSD.

10 Claims, 30 Drawing Sheets

(56) References Cited

U.S. PATENT DOCUMENTS

| | | | |
|---|---|---|---|
| 2015/0207130 A1* | 7/2015 | Maguire | B60L 58/21 |
| | | | 429/97 |
| 2017/0179548 A1 | 6/2017 | Lee et al. | |
| 2019/0288345 A1 | 9/2019 | Hinterberger et al. | |
| 2020/0152950 A1 | 5/2020 | Rodriguez et al. | |
| 2020/0195001 A1 | 6/2020 | Griffiths | |
| 2020/0203683 A1 | 6/2020 | Elfering et al. | |
| 2020/0223315 A1 | 7/2020 | Binder et al. | |

FOREIGN PATENT DOCUMENTS

| | | | | |
|---|---|---|---|---|
| CN | 205723689 U | 11/2016 | | |
| WO | WO-2015078049 A1 * | 6/2015 | | B60L 3/0007 |

OTHER PUBLICATIONS

International Patent Application No. PCT/US2021/059092; Int'l Written Opinion and Search Report; dated Mar. 9, 2022; 9 pages.
International Patent Application No. PCT/US2021/059092; Int'l Preliminary Report on Patentability; dated May 23, 2024; 10 pages.

\* cited by examiner

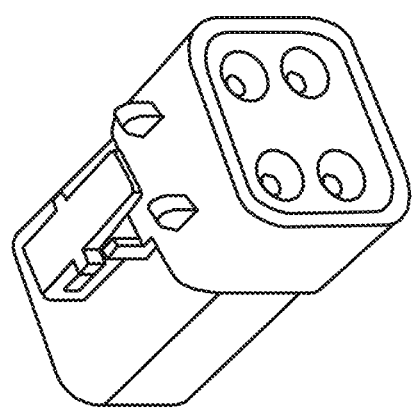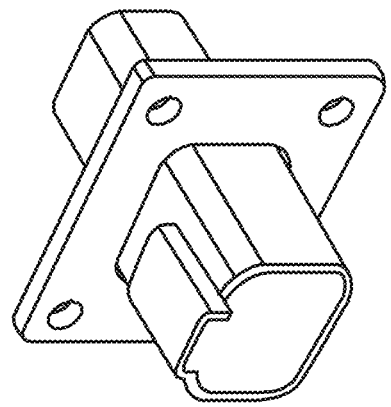
FIG. 8 (Prior Art)

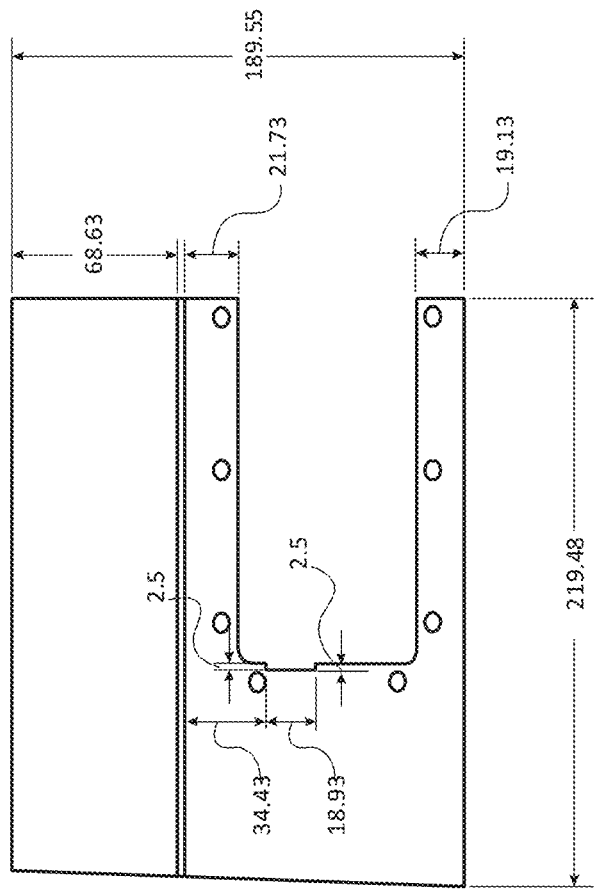
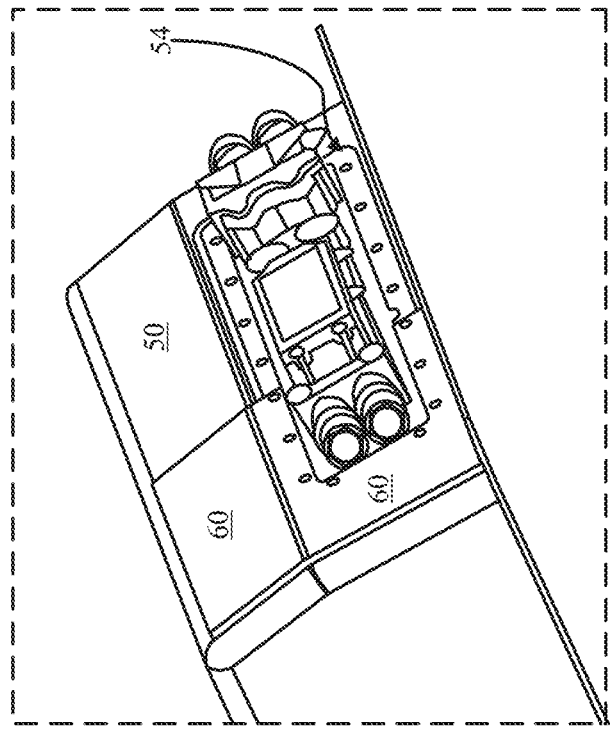
FIG. 20

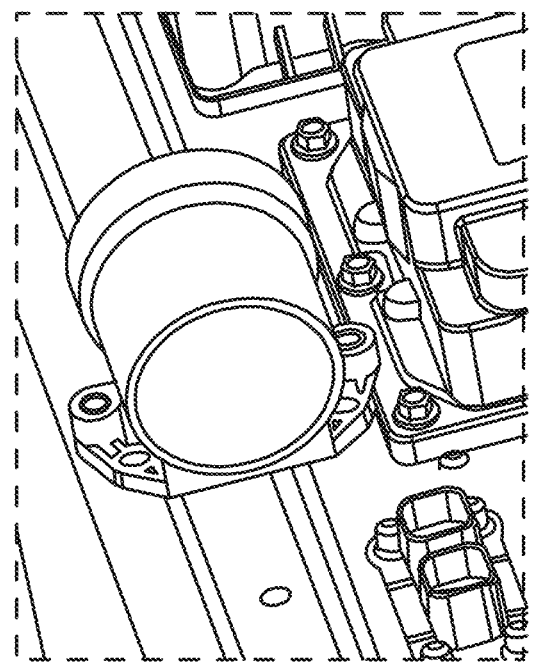
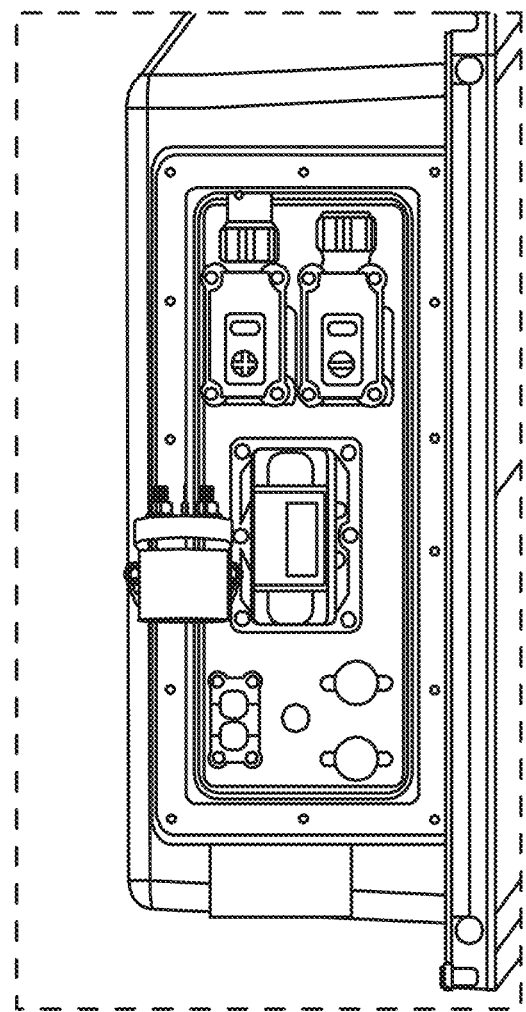
FIG. 26

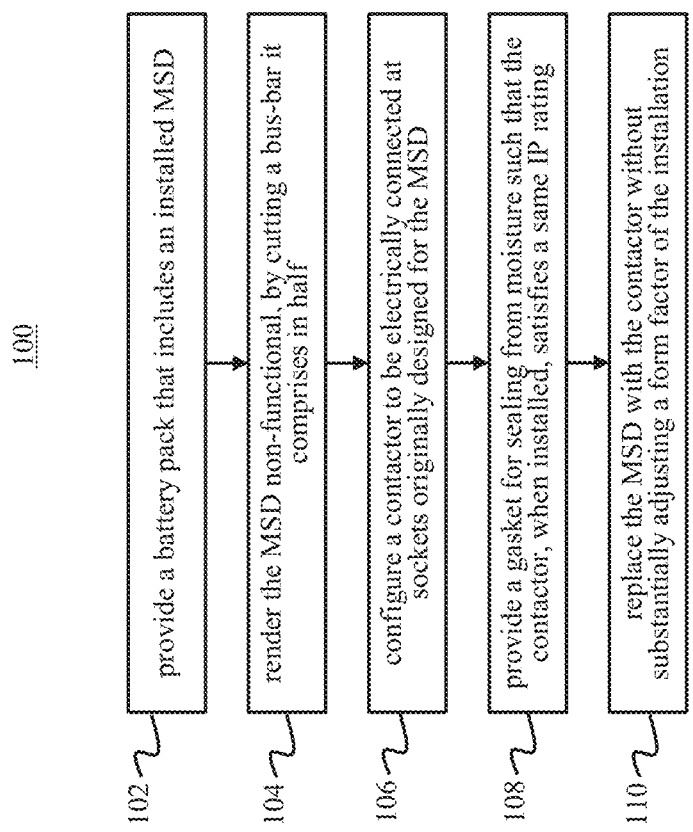

SYSTEMS AND METHODS FOR ADDING A CONTACTOR AT OR NEAR AN MSD

CROSS-REFERENCE TO RELATED APPLICATIONS

The present application is a Continuation of International Patent Application No. PCT/US2021/059092, FILED Nov. 12, 2021, titled SYSTEMS AND METHODS FOR ADDING A CONTACTOR AT OR NEAR AN MSD, the entire contents of which are incorporated by reference herein.

TECHNICAL FIELD

The present disclosure generally relates to systems and methods for integrating a contactor to a battery pack previously including a manual service disconnect (MSD) and/or fuse, without substantial modification of the pack and corresponding components.

BACKGROUND

MSDs form connections, and an unplugging thereof purposefully terminates a connection. MSDs protect by disconnecting a battery pack to make them safer to handle and to protect it from short circuiting. Contactors may be electrically controlled for relaying a high voltage (HV) connection and may be physically removed as well. Each contactor may de-energize one or more HV connections.

Relays are known to have coils for generating a magnetic force that mechanically operates an electric contact. Contactors often do the same, but relays are for low and medium power whereas contactors operate for high power devices.

Battery packs are known to be integrated in original equipment manufacturer (OEM) applications, such as commercial electric vehicles. Identical battery modules or individual cells (e.g., having an amount of 6, 8, 10, or another quantity of units) may be installed in each battery pack. They may be configured in a series, parallel, or a combination of both to deliver the desired voltage, capacity, or power density.

Once packs have been approved by a Country's certification agencies and/or in accordance with safety regulations it is a desideratum to improve safety and function requiring a complete recertification.

DISCLOSURE

Systems and methods are disclosed MSDs and/or fuses, without contactors to be updated with minimal alteration to certified systems and/or enclosures via providing an efficient drop-in replacement, e.g., to add contactors to battery packs that were not designed for them. Accordingly, one or more aspects of the present disclosure relate to a system and/or method for replacing an MSD, e.g., by providing a set of batteries that include an MSD; removing the MSD; and installing a contactor at the MSD.

The method is implemented by a system comprising a battery pack, contactor, and one or more hardware processors configured by machine-readable instructions and/or other components and or in signal communication with one or more controllers. Implementations of any of the described techniques and architectures may include a method or process, an apparatus, a device, a machine, or a system.

Disclosed herein are some aspects of exemplary implementations of systems, device and methods associated with replacing a manual service disconnect (MSD) of a mobile power supply by providing a set of batteries that include an MSD; removing said MSD; and installing a contactor at the MSD. In some instances the contactor tis configured to o be electrically connected at sockets originally designed for the MSD. In some instances a front surface of the contactor is integrated in a cavity of the MSD. In some instances a rear surface of the contactor is coupled to a cover plate that has substantially a same form factor as a cover plate of the MSD.

The following description of examples of implementations, reference is made to the accompanying drawings that form a part hereof, and which show, by way of illustration, specific implementations of the present disclosure that may be utilized. Other implementations may be utilized and structural changes may be made without departing from the scope of the present disclosure.

BRIEF DESCRIPTION OF THE DRAWINGS

The details of particular implementations are set forth in the accompanying drawings and description below. Like reference numerals may refer to like elements throughout the specification. Other features will be apparent from the following description, including the drawings and claims. The drawings, though, are for the purposes of illustration and description only and are not intended as a definition of the limits of the disclosure.

The invention may be better understood by referring to the following figures. The components in the figures are not necessarily to scale, emphasis instead being placed upon illustrating the principles of the invention. In the figures, like reference numerals designate corresponding parts throughout the different views.

FIG. 8 illustrates an example of low voltage (LV) connectors, in accordance with the prior art.

FIG. 20 illustrates a battery pack with a mounting plate and its exemplary dimensions, in accordance with one or more embodiments.

FIGS. 25-28 illustrate different examples of a contactor mounted in relation to a battery pack, in accordance with one or more embodiments.

FIG. 29 illustrates a process for providing an integrated contactor, in accordance with one or more embodiments.

Figure 1:
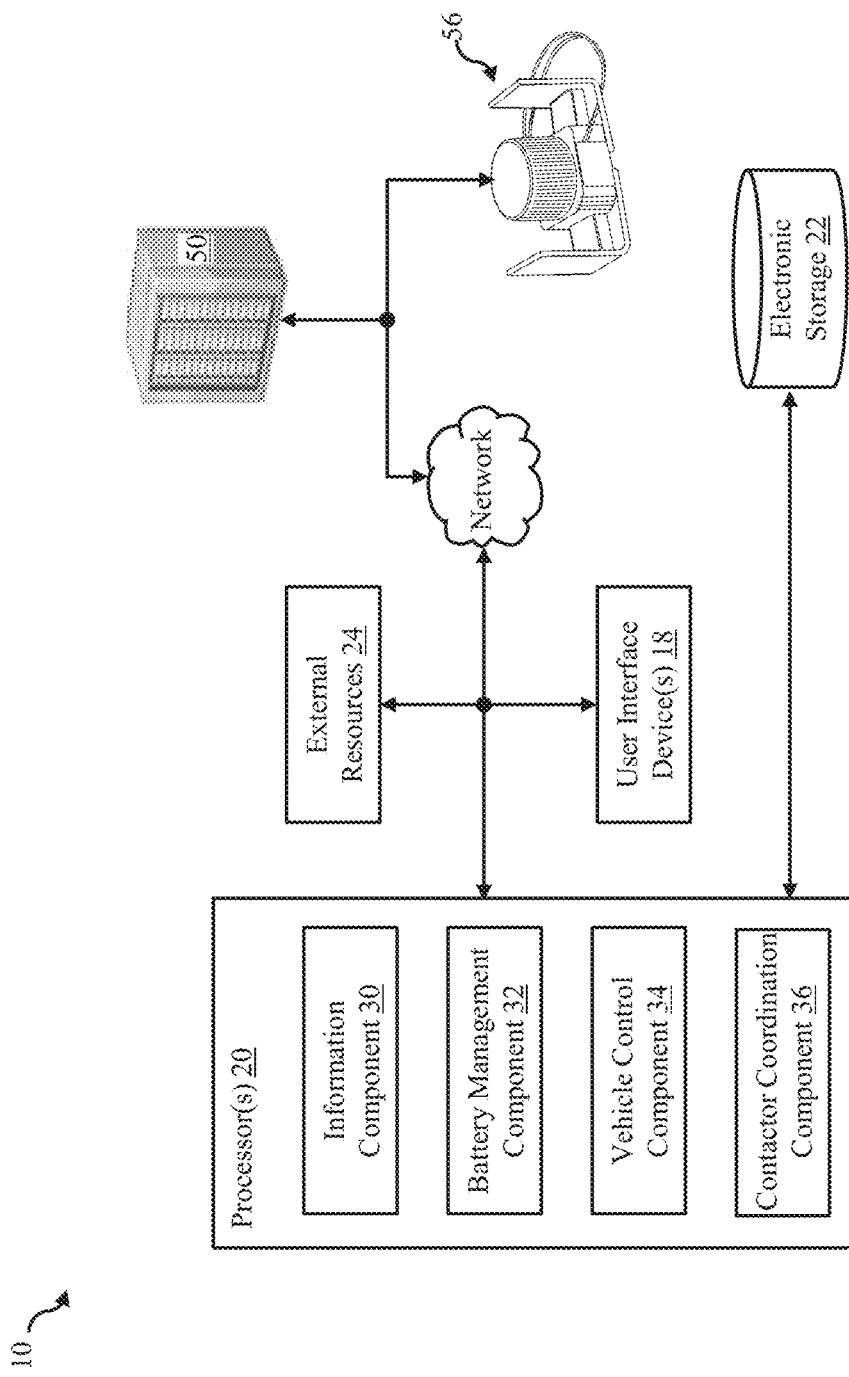
FIG. 1 illustrates an example of a system in which a contactor may be integrated, in accordance with one or more embodiments.

All descriptions and callouts in the Figures and all content therein are hereby incorporated by this reference as if fully set forth herein.

FURTHER DISCLOSURE

As used throughout this application, the word "may" is used in a permissive sense (i.e., meaning having the potential to), rather than the mandatory sense (i.e., meaning must). The words "include," "including," and "includes" and the like mean including, but not limited to. As used herein, the singular form of "a," "an," and "the" include plural references unless the context clearly dictates otherwise. As employed herein, the term "number" shall mean one or an integer greater than one (i.e., a plurality).

As used herein, the statement that two or more parts or components are "coupled" shall mean that the parts are joined or operate together either directly or indirectly, i.e., through one or more intermediate parts or components, so long as a link occurs. As used herein, "directly coupled" means that two elements are directly in contact with each other. As used herein, "fixedly coupled" or "fixed" means that two components are coupled so as to move as one while maintaining a constant orientation relative to each other. Directional phrases used herein, such as, for example and without limitation, top, bottom, left, right, upper, lower, front, back, and derivatives thereof, relate to the orientation of the elements shown in the drawings and are not limiting upon the claims unless expressly recited therein.

These drawings may not be drawn to scale and may not precisely reflect structure or performance characteristics of any given embodiment and should not be interpreted as defining or limiting the range of values or properties encompassed by example embodiments.

Unless specifically stated otherwise, as apparent from the discussion, it is appreciated that throughout this specification discussions utilizing terms such as "processing," "computing," "calculating," "determining," or the like refer to actions or processes of a specific apparatus, such as a special purpose computer or a similar special purpose electronic processing/computing device.

Presently disclosed are ways of providing plug-in contactors, each of which (i) actively replacing an existing MSD or fuse (e.g., in an MSD housing) and/or (ii) suitably being coupled in a connection box protected against environmental influence, at battery packs. Accordingly, safety is increased by including contactor(s) on battery packs, without materially redesigning the packs thereby providing generational updates to the technology without requiring a complete recertification. For example, existing MSD connections may be retrofitted such that a contactor replaces it. The contactor may serve by breaking at least one of the terminals of a circuit (i.e., to remove the power flow) in the event of a crash, over-voltage scenario, or another form of failure such that the circuit opens.

FIG. 1 illustrates system 10 configured to easily add a contactor to different battery packs, including those of different models or types which are not currently configured for their use. Contactors provide functionality that is similar to and/or redundant with MSDs, but with the added benefit of being remotely controlled. And the contactor may be provided for a battery system of any size. Some exemplary implementations may involve custom provision of a new contactor and/or special re-configuration of an existing contactor. For example, connection bars, pins, or another style connector may be provided for interfacing with slots, sockets, or another style connector previously designed for MSDs (of any type or brand) and fuses. In this or another example, a lower voltage coil may be provided to operate the contactor. In one or more of these or another example, the added contactor may provide a secondary monitoring of its primary contacts, e.g., to determine positioning and/or whether there is welding.

In some exemplary implementations, contactor 56 may be configured to directly replace an existing MSD and/or fuse, which may be inside an enclosure. The relay operation of the contactor may be controlled by a vehicle control unit (VCU), battery management system (BMS), and/or another controller (e.g., which may coordinate actuation thereof based on separate logic, the VCU, and/or the BMS).

Figure 7B:
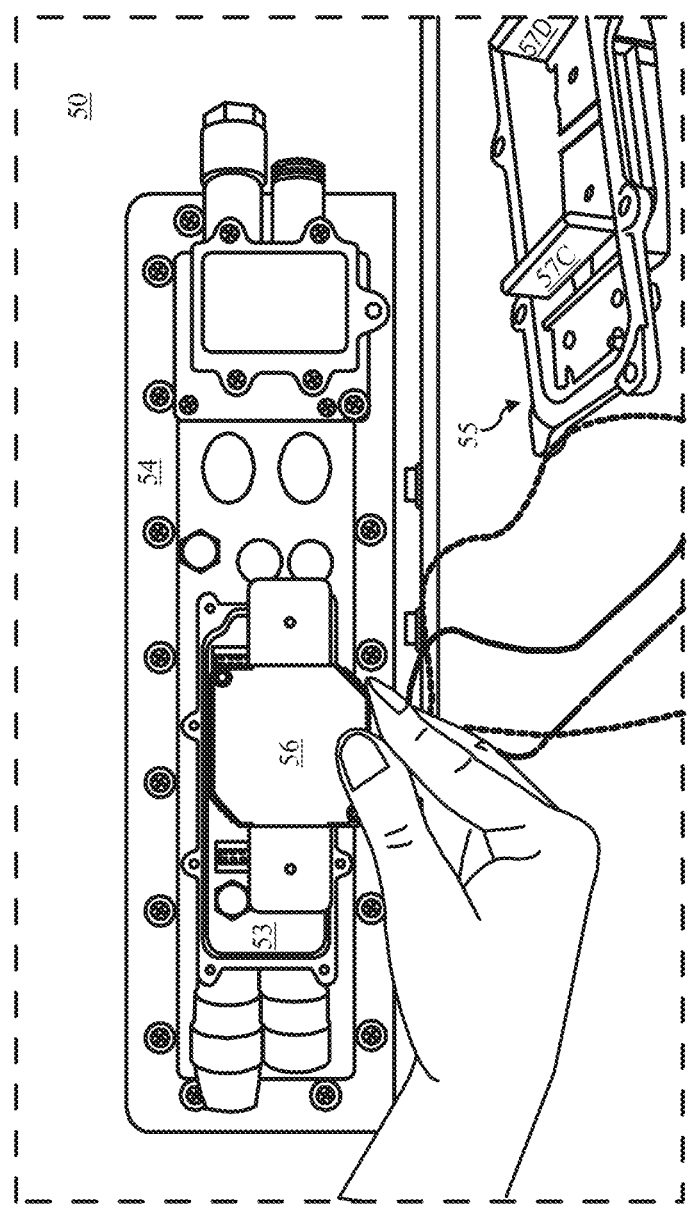
FIGS. 7A-7C illustrate an example of a contactor being installed with a cover at the battery pack, in accordance with one or more embodiments.
Figure 7A:
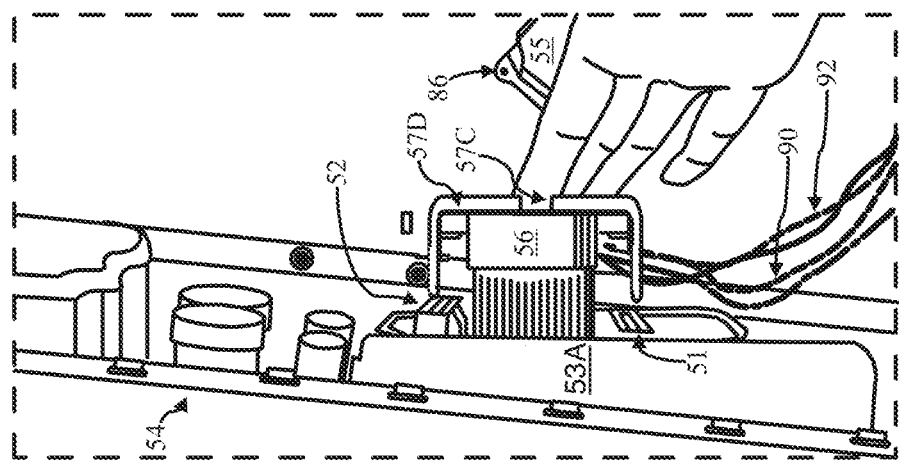
Figure 7C:
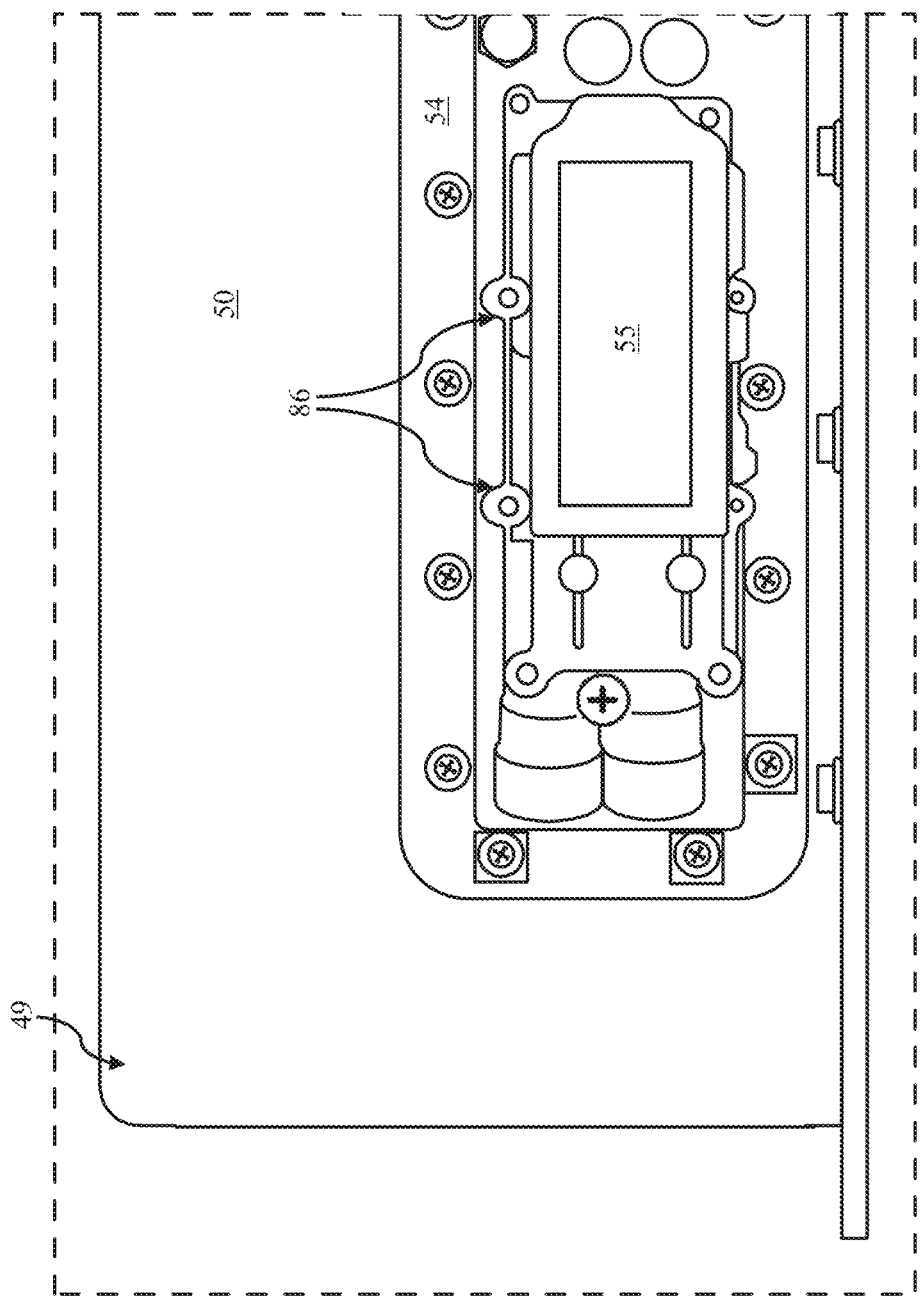
Figure 21:
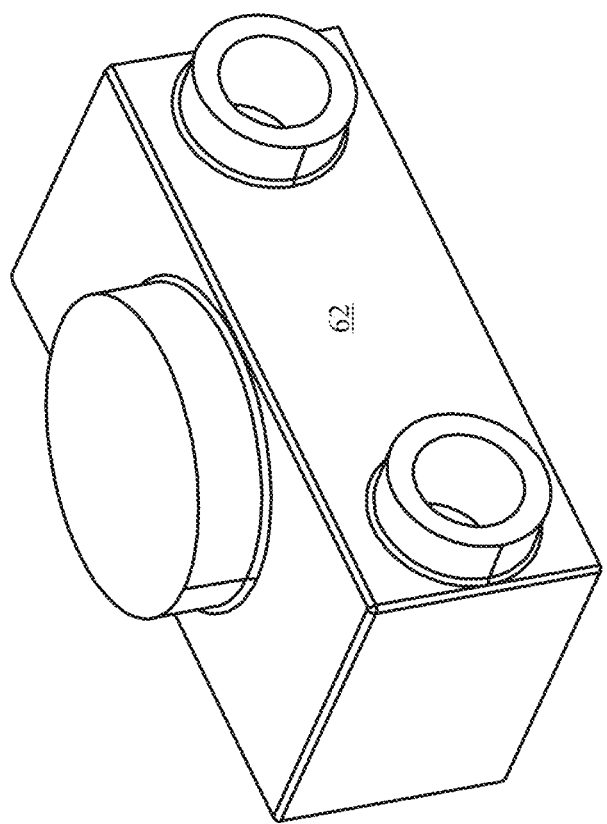
FIG. 21 illustrates an example of a contactor's housing, in accordance with one or more embodiments.

In some exemplary implementations, each of contactors 56 may be provided with custom housing, such as cover 55 of FIGS. 7A-7C (e.g., which mates with pre-existing MSD housing 53) or housing 62 of FIG. 21. Such housing may provide weatherproof (e.g., waterproof) connection to MSD housing 53.

In some exemplary implementations, mounting of contactor 56 to battery pack 50 may be provided by minimizing vibration at the electrical connections thereabout.

In some exemplary implementations, one or more contactors 56 may be configured with connectors or other connections for supporting the LV interface.

In some exemplary implementations, contactors 56 may be integrated at battery pack 50, e.g., without physically modifying the pack or any existing high-power cable, as shown in the example of FIGS. 7A-7C. Such installation of the contactor improves without having to bolt the contactor onto battery pack 50 and thus without requiring a new, sealed enclosure. Exemplary implementations having contactor 56 embedded at the MSD (as shown in FIGS. 7A-7C) and exemplary implementations having a contactor mounted on plate 60 (as shown in FIGS. 12-13 and 16-20) may avoid need for new bolts, which introduce the risk of leaking. One or more of these exemplary implementations may avoid need for renewed vibration/shock testing and/or need for having high power cables terminate at new locations.

In some exemplary implementations, contactor 56 may be operated remotely, e.g., to remove a high voltage. In an exemplary implementation, the contactor or its controller may obtain an output signal from a (e.g., crash) sensor. In this or another exemplary implementation, the contactor may automatically protect or save the respective battery or battery pack, when power is removed, e.g., by opening the circuit.

In some exemplary implementations, system 10 may implement safety (e.g., by saving battery packs 50) by complementing or replacing an MSD, fuse, and/or other circuit that disables/controls power (or another connection), via one or more contactors 56. As such, there may be an assurance that no electrical connection is provided to at least one of the terminals or connectors (e.g., 80, 81, etc.) effectively preventing harm, in the presence of a short circuit, or a shocking, by someone touching a terminal.

Figure 6:
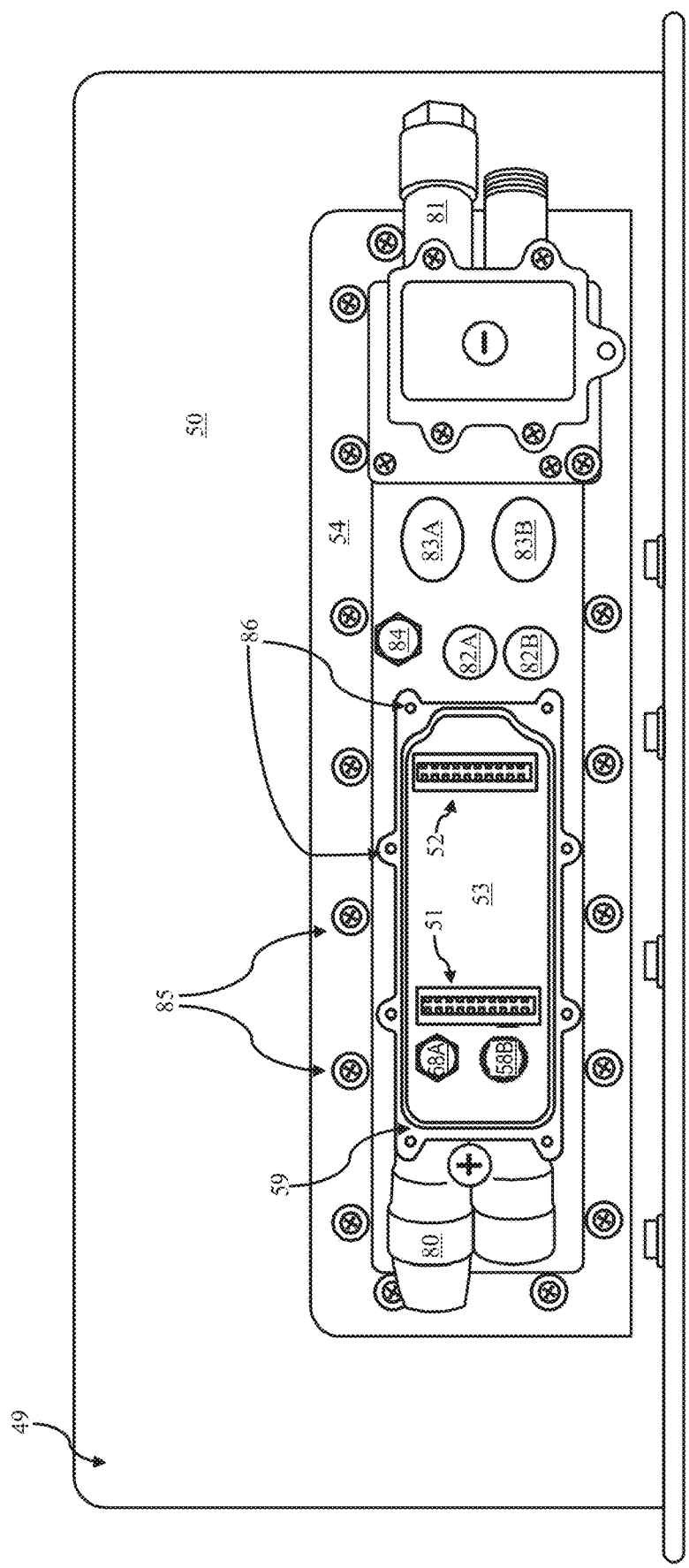
FIG. 6 illustrates an example of a battery pack, in accordance with the prior art.

In some exemplary implementations, contactor 56 may be a high voltage contactor, which can be directly plugged-in to MSD receptacles 51-52. As such, addition of the MSD may be performed (i) with no change in high voltage (HV) cable connections resulting in exposed HV wiring and (ii) with minimal added weight. The replacement or adjustment of the MSD, by adding a contactor, may further be performed with no change to base portion of panel 54 of battery pack 50. For example, only MSD replacement cover 55 may differ, in configuration, from a pre-existing MSD cover. In this example, MSD replacement cover 55 may form a compartmental seal via use of O-ring 59 (as shown in the example of FIG. 6), which extends around an outside of MSD cavity 53, when mating with MSD replacement cover 55 after making connections at 58A-58B. This seal, with contactor 56 embedded within, may maintain or improve upon a seal made with the pre-existing MSD cover, e.g., at ingress protection 65 (IP65), IP66, IP67, IP68, or at another IP level.

Figure 3A:
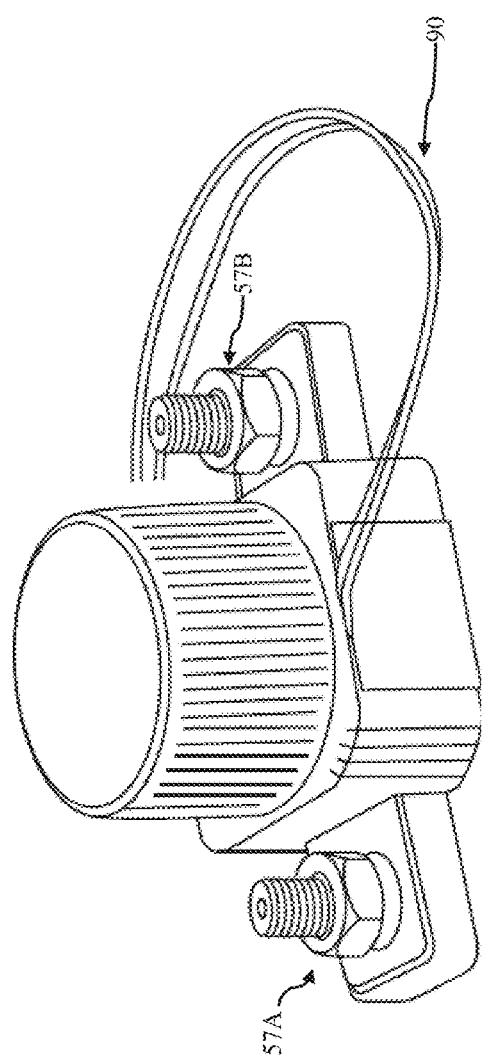
FIGS. 3A-3B illustrate two examples of a contactor, in accordance with one or more embodiments.
Figure 3B:
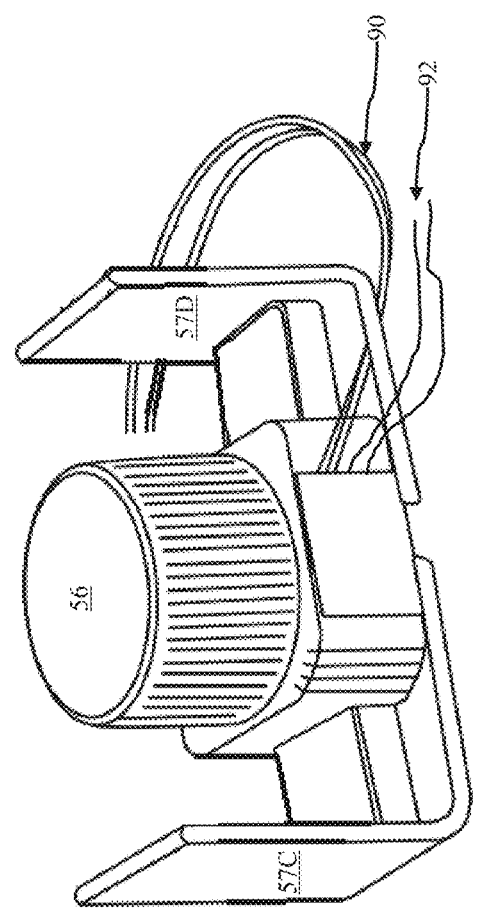

In some exemplary implementations, contactor 56 may be modified, as shown in the adjustment from FIG. 3A to FIG. 3B. More particularly, fasteners and bolt-on terminals 57A-57B may be removed and plugs 57C-57D may be added instead to have direct connection when plugging the contactor into slots 51-52 of panel 54. With the normally open (NO) configuration of the contactor, the positive (or negative) connection may not be live, i.e., having no connection to it. FIG. 3A thus depicts a relatively small contactor having standard connections, and FIG. 3B depicts a contactor with added prongs 57C-57D for making HV connections.

FIG. 6 depicts panel 54 of battery pack 50, including slots 51-52 surrounded by a cavity 53 into which an existing MSD may be plugged. The panel may be metallic and thus with a certain amount of rigidity and strength. And this panel may be connected to and supported by a base plate, which may be a metallic cooling plate at the bottom.

Figure 9:
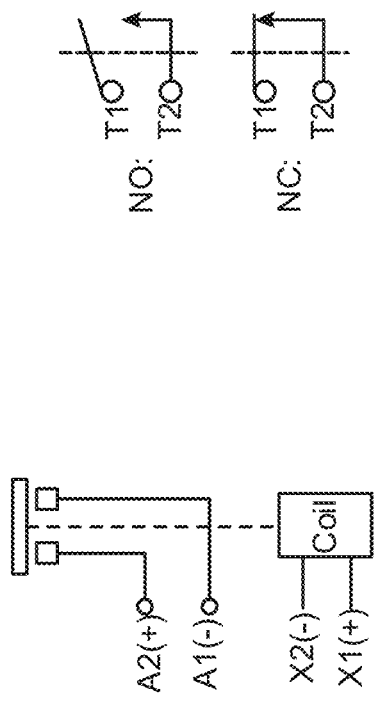
FIG. 9 illustrates an example of a contactor, in accordance with the prior art.

In some exemplary implementations, contactors 56 may be integrated into packs 50, enabling remote control of the power terminal (e.g., by applying a low voltage via wires 90 to the coil depicted in FIG. 9). For example, the contactor may be pulled in or released (e.g., in the case of an accident sensed by a sensor, power may be pulled off the contactor and it may open without anyone having to be there to unplug it as with an MSD or fuse).

FIGS. 7A-7C depict contactor 56 modified and configured to plug into a housing (e.g., of an MSD or another existing, circuit-adjusting device). For example, HV connections 57 of the contactor may be configured to be electrically connected at sockets 51-52 originally designed for the MSD. And a front (i.e., left hand side) surface of contactor 56 may be integrated in cavity 53 of the MSD, as shown in FIG. 7A, while a rear surface (i.e., right hand side) of the contactor may be coupled to cover plate 55 that has substantially a same form factor as a cover plate of the MSD.

FIGS. 7A-7B show contactor 56 in the process of being installed, e.g., by inserting it towards slots 51-52 of existing MSD cavity 53A. In this configuration, the MSD is effectively removed at this point, e.g., by having its metal piece be cut in half. As such, prongs 57C-57D of contactor 56 may plug into slots 51-52, respectively, e.g., with there no longer being a continuous bar between them. But then the connection may be physically made inside the contactor, while properly and securely retaining the contactor in the slots at a same time.

In some exemplary implementations, contactor 56 may be coupled to a metal plate, e.g., previously serving as an aluminum bus bar for the MSD. For example, upon cutting this bar in half, the two pieces 57C-57D may connect to the terminals of the contactor. And together these components are mounted into a cavity 53 via slots 51-52 so that structural strength in holding the contactor is achieved. In this example, the mounting may be performed by fastening protrusions of the contactor into openings of the bus bar, as is demonstrable with respect to the lower-right corner of FIG. 7B.

In some exemplary implementations, MSD replacement cover 55 may comprise a casing that adds a minimal amount (e.g., 5-6 millimeters (mm)) to current dimensions of an existing MSD cover. In other implementations, cover 55 may not cause the MSD cover to be taller but rather be of the same height (i.e., with the contactor fitting inside an enclosure of pack 50) or smaller. In some exemplary implementations, MSD replacement cover 55 may form part of a custom housing.

In some exemplary implementations, housing 55 may be developed to cover contactor 56, e.g., when the contactor extends out a little further (e.g., 5-10 mm) beyond an extent of the existing MSD's cover. In some exemplary implementations, the enclosure housing contactor 56 may be formed by cover 55 and cavity walls 53A. This enclosure, when contactor 56 is integrated therein, may further comprise a connector for LV coil wires 90 and secondary contactor-position contacts 92 (i.e., for checking the position of the primary contacts). FIG. 8 depicts an example of LV connections, e.g., which may comprise a panel mount connector for integrating into the contactor's housing (e.g., at cover 55, receptacle (sidewall or base portion) 53, box 62, or another suitable compartment). Accordingly, weatherproofing may be provided at both LV and HV connections.

In some exemplary implementations, openings 86 may be formed along a border of cavity 53, e.g., for fastening or bolting cover 55 thereover. For example, the same bolt holes used for the original MSD cover may be used to fasten cover 55. And, as mentioned, when thus securing cover 55, O-ring 59 may be used to better seal cavity 53.

An advantage of installing contactor 56 in the MSD case is that an existing cable connection may be reused. Another advantage is that real estate on (e.g., by using same x-y dimensions at cover 55 as with an existing MSD's cover when interfacing at cavity 53, as shown in FIG. 6) panel 54 of battery pack 50 and on front surface 49 of this pack may be saved, as shown in the example embedding of contactor 56 at cavity 53 in FIGS. 7A-7C. And, in this configuration, the contactor may be installed without its housing protruding substantially (e.g., beyond an extent of when the MSD's housing was installed) such that a probability of damage thereabout is minimized.

In exemplary implementations when contactor 56 is not integrated under cover 55 at cavity 53, the contactor may require a separate (e.g., IP68) enclosure 62, e.g., to protect against the environment, including moisture, humidity, dust, pressure, and/or another environmental effect. In herein-disclosed implementations, enclosure 62 or cover 55, when used to secure a contactor, may satisfy, or improve upon the IP rating of battery pack 50.

Figure 13:
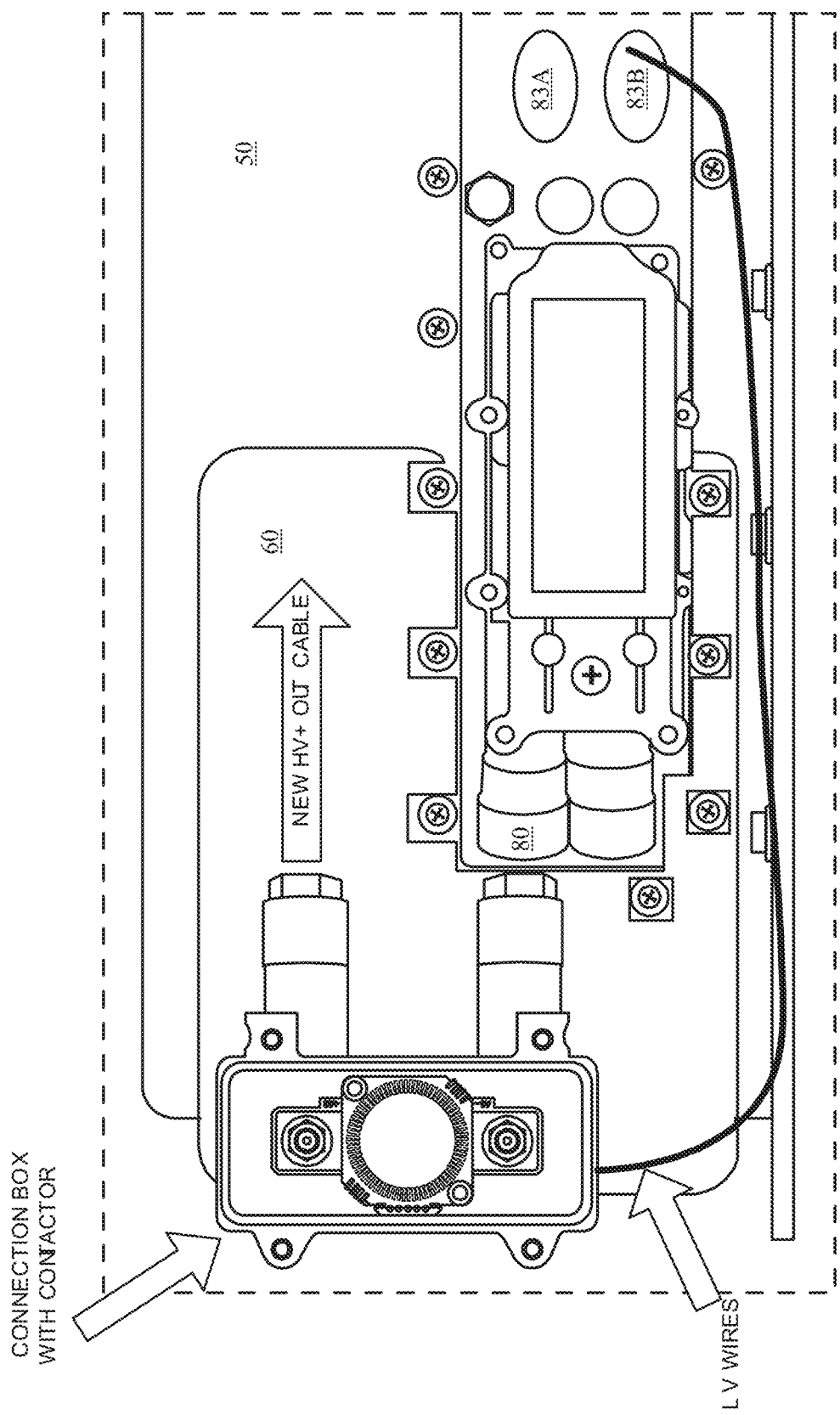
FIG. 13 illustrates an example of a contactor coupled to the mounting plate of the battery pack, in accordance with one or more embodiments.

FIGS. 13 and 21 depict connection box 62. This enclosure may enable the contactor's installation to be waterproof, e.g., when sealed therein.

In some exemplary implementations, contactor 56 may be an NO contactor (i.e., normally not connected), which automatically protects or saves an environment of the mobile power source (e.g., vehicle), when low voltage (LV) power is lost by opening the circuit. For example, use of contactor 56 that replaces an MSD may perform auto-safe functionality, in the case of a car crash.

In some exemplary implementations, contactor 56 may be an electrically controlled switch or relay of an electrical power circuit, e.g., with the switch operating at a much higher power level than the circuit it directly controls. The contactor may be in any configuration, such as NO (e.g., for opening the circuit upon loss of power during an accident, upon loss of communication with the contactor for whatever reason, or upon an LV command being received by a controller), as depicted in FIG. 9.

In some exemplary implementations, contactor 56 may leverage secondary contacts 92 (as shown in FIGS. 7A-7B), for monitoring and subsequent warning of welded contacts at or near the contactor. In some exemplary implementations, powering up the coil of contactor 56, e.g., via LV connections 90, may cause a pulling-in of both of the main contacts, e.g., to make connection between slots 51-52, similar to or identical with how the existing MSD would be installed. In these or other embodiments, contactor 56 may comprise secondary set of contacts 92, informing a position of the connections and to indicate whether they actually pulled in as expected.

In some implementations, connections on contactor 56 may become welded or stuck, e.g., when very high current is passed through the contacts. As such, the secondary set of contacts, which are LV, indicate if the HV contacts of the relay have become welded through some high current event rendering pack 50 unsafe (by failing in a closed-circuit configuration). Physical, visual inspection of contactor 56 may not indicate this problematic state where the HV terminal appears to not be live but may actually be live.

In some exemplary implementations, contactor 56 may comprise two primary and two secondary contacts or wires, as depicted in FIGS. 7A-7B, 9-10, and 14-15. One may be ground, and another may be 12 volts (V) such that when 12 V is applied to it, the contactor pulls in (or extends out) and makes that connection. The other two wires may be the secondary contacts, which inform the position of the main contactor contacts, as mentioned. For example, after the 12V command to actuate the contactor is obtained, these secondary contacts may indicate a proper response thereat or if there is a failure scenario.

In some exemplary implementations, one or more contactors may be controlled via a battery management system (BMS), a vehicle control unit (VCU), and/or a separate controller that coordinates these and/or other controller(s). For example, contactor 56 may be controlled via two or more different means, including a BMS, VCU, and/or another controller. The BMS and VCU may be implemented at battery management component 32 and vehicle control component 34, respectively.

In some exemplary implementations, a computing device that controls the contactor may have a predetermined location, the controlling being performed based on a coordination between the BMS, VCU, and the other control unit. For example, the controlling logic may be based on one or more signals (e.g., a crash sensor's output). In some exemplary implementations, a location of where the power comes from may also or alternatively be predetermined (e.g., via the battery system or directly via the vehicle supply).

In some exemplary implementations, the coordination of the contactor's control may be based on closing sequencing of a number of other, different contactors (e.g., on the battery pack, in the junction box, at the power distribution box where all individual packs are connected, and/or a contactor used at another location or for another function). For example, before actuating one contactor, the controller may query the status of other contactor(s) to determine whether it is (i) safe or appropriate to proceed or (ii) better to first wait some time or wait for a message to be received. As such, a plurality of contactors (e.g., including those of different types) may all be controlled by one overall controller (e.g., via contactor coordination component 36). Alternatively, logic for controlling contactor 56 may be implemented at the VCU or BMS.

In some exemplary implementations, it may take a certain amount of time for these contactors to pull in (e.g., 50 milliseconds (ms)), which may require these contactors to be closed before the main contactors in the connection box are closed. As such, a likelihood that the contactors weld is substantially reduced.

Figure 10:
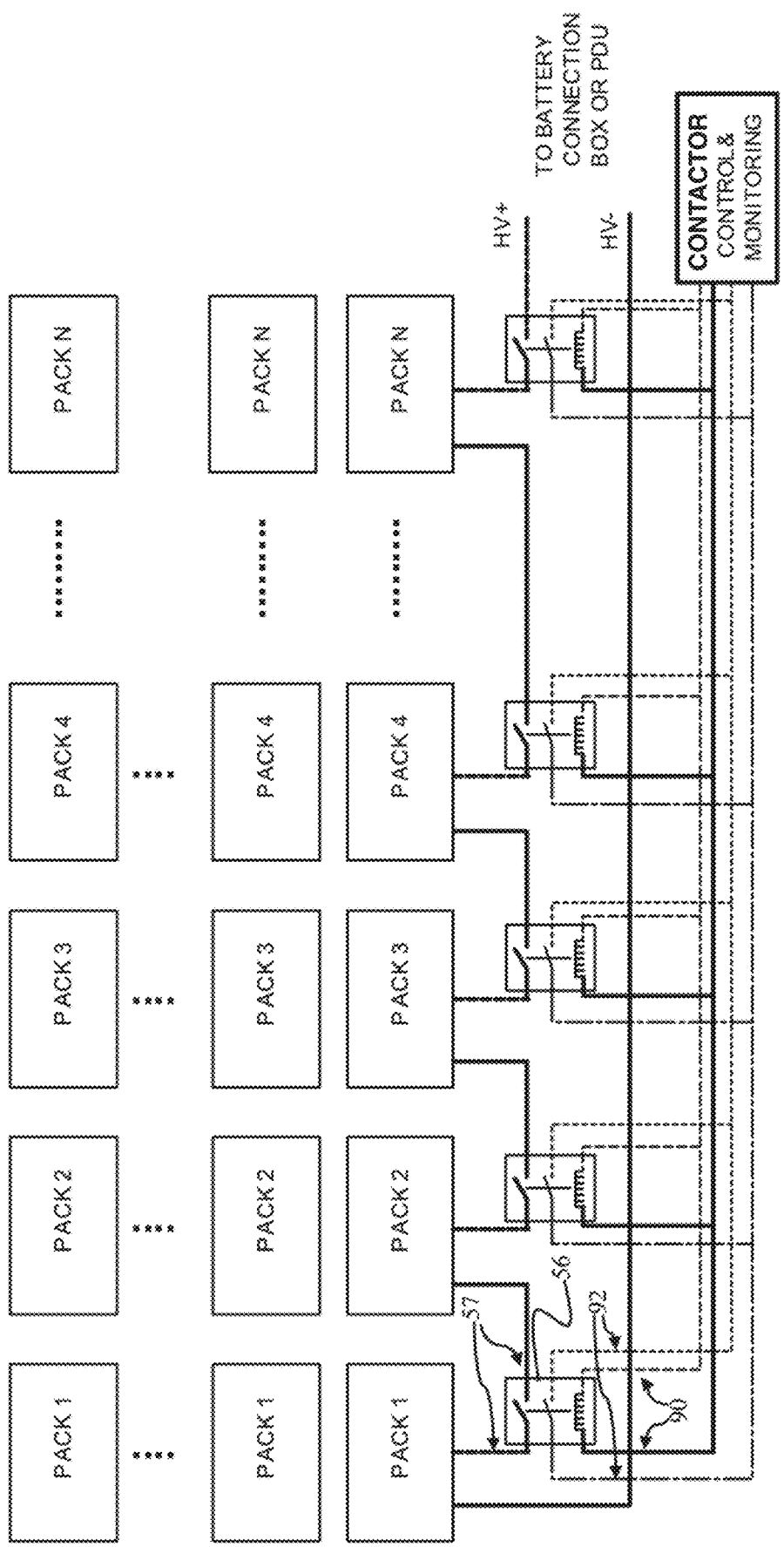
FIG. 10 illustrates an example of contactors installed at battery packs, in accordance with one or more embodiments.

In some exemplary implementations, there may be multiple battery packs 50 or multiple strings of packs, as depicted in FIG. 10, which would go into a connection box. And, in that connection box, there may be either separate sets of contactors or a much larger contactor that may, e.g., connect and disconnect the entire battery system in just one motion. There may thus be different orderings or sequences desirable for actuating the different contactors (e.g., vis a vis the recharge contactor). A proper order of contactors' actuation may substantially lengthen a lifetime of the contactors.

Figure 11:
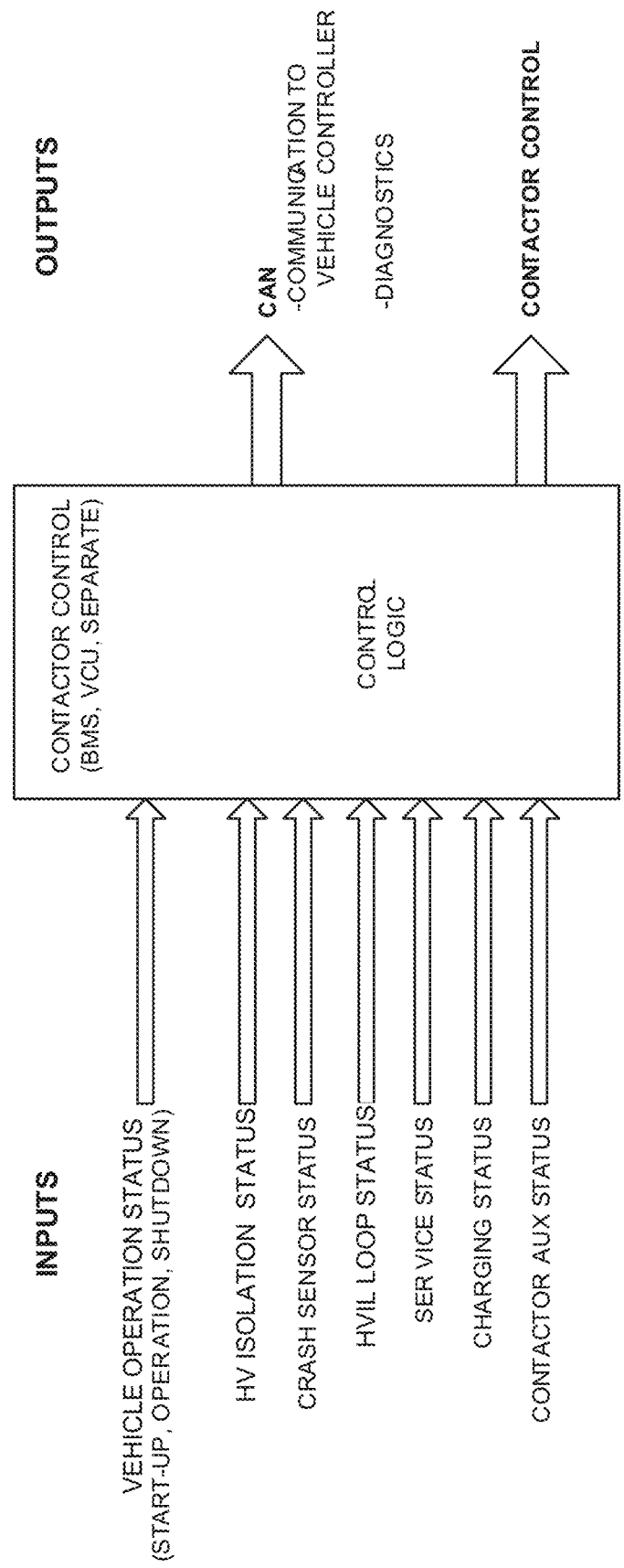
FIG. 11 illustrates an example of logic for controlling a contactor, in accordance with one or more embodiments.

FIG. 11 depicts inputs and outputs (I/O) for controlling contactor 56. For example, the control logic depicted therein may be implemented via contactor coordination component 36 such that several inputs are obtained and processed for controlling one or more contactors 56. For example, primary and/or secondary sensors (e.g., crash sensor, roll sensor, or another type of sensor) may output signals obtained at the control logic for controlling the contactor.

As shown in FIG. 11, one of the inputs to the control logic (e.g., which may be implemented via contactor coordination component 36 of processor 20) may be a high voltage interlock loop (HVIL) loop status. This signal may relate to a safety feature of hybrid and all-electric vehicles that protects people during the assembly, repair, maintenance, and operation of a vehicle. For example, the HVIL system may protect anyone who might come into contact with HV components at any stage in its lifecycle. HVIL acts as a kind of circuit breaker that sends an alert if a high-voltage connection becomes loose, disconnected, or damaged during the operation of the vehicle. HVIL also helps protect a vehicle's driver and passengers in the event of an accident. HVIL may use a continuous, LV loop that monitors all HV connectors and components of the vehicle. If the LV HVIL signal is interrupted for any reason, it indicates that there is an issue with the HV system.

Contactor control may involve variable-size signal generation and operations. For example, a variable-size signal may be created using a switch block. The input signals to the switch block may differ in their number of dimensions and in their size. An output from the switch block may be a 2-dimensional (2D) variable-size signal with a maximum size of 3×2. In this or another example, a variable-size signal may be created from a single data signal. The data signal (constant 5) may be a 3×4 matrix. A used pulse generator may represent a control signal that selects a starting and ending index value, and a selector block may then use the index values to select different parts of the data signal at each time step and output a variable-size signal.

In some exemplary implementations, contactor coordination component 36 may implement simplified control of contactor 56. In a first example, the contactor may operate normally, e.g., with the contactor being closed 50 ms before the S-box main contactor receives a close command and with the contactor being opened 50 ms after the S-box main contactor receives an open command.

In a second example, charging may be performed, requiring 12 V always on power, since there may be no key signal, e.g., with the contactor being closed 50 ms before the S-box main contactor receives the close command and with the contactor being opened 50 ms after the S-box main contactor receives the open command.

In a third example, maintenance of other service may be performed with the S-box MSDs removed (but with the key on). In this example, the contactor may open immediately after the High Voltage Board (HVB) senses loss of MSD (no HV or auxiliary contacts if there); the S-box main contactors open too, with timing not being critical due to there being no MSD. If MSDs are reinserted, then the contactor may close 50 ms before the S-box main contactor receives the close command.

In a fourth example, a crash or another accident may occur (with a key being on or off, and with the MSD being out). If the key is turned off prior to MSD removal, normal shutdown may be performed (i.e., the first example). If the MSD is removed with the key power on, the contactor may open immediately after the HVB senses loss of the MSD; the S-box main contactor may open too. MSDs may not be reinserted, after a crash, until a full system diagnostic can be performed.

In a fifth example, HV isolation failure detection may occur. As such, the contactor may open immediately. And, if isolation failure is resolved, the contactor may reclose 50 ms prior to the S-box main contactor receiving the close command.

The herein-disclosed approach improves by adding at least one contactor to a mobile power supply, without adding substantial redesign and without a full revalidation of pack(s) 50. For example, an existing vehicle may have pack(s) 50, at least one of which having the added contactor(s) without adjusting a location of an HV connection and/or without adjusting routing of an existing cable at the vehicle. Eliminating such need for re-routing of power cables is significant, as they tend to be of a very high gauge wire, which precludes their ability to bend sharply.

In some exemplary implementations, panel 54 may comprise a box, depicted at the right-hand side of FIG. 6, at which may be a negative terminal of battery pack 50. As such, a high voltage cable may come in from the right-hand side at metallic connector 81. For example, the cable may come right in through that box and be bolted onto a negative terminal of the battery inside that box. In this or another example, a corresponding positive connection may come in from the left-hand side at connector 80, depicted also in FIG. 6. The positive cable(s) or wire(s) may traverse inwards towards the MSD cavity 53, and they would be bolted to one or more of connection points 58A-58B, e.g., before cover 55 is installed over the cavity to seal it.

In some exemplary implementations, panel 54 may have one or more other connectors for battery pack 50, as depicted in FIG. 6. For example, connections 82A-82B may interface with internal heaters in the pack. In this or another example, connections 83A-83B may be used for the LV connections, such as for a controller area network (CAN) communication and for a 12 V or a 24 V vehicle power supply to power up some of the electronics inside the pack. Panel 54 may also comprise vent port 84, e.g., enabling pressure to equalize inside and outside the pack when the vehicle changes altitude, without allowing any type of water or humidity into the pack.

In exemplary implementations with a BMS, this BMS may control contactor 56 via wires routing from LV connector(s) 83A and/or 83B.

FIG. 9 depicts electrical connections of battery pack 50 (e.g., CATL pack). For example, connection A2(+) may connect with an existing HV+ connection of battery pack 50, and connection A1(−) may connect with a new HV output to a next pack or to the System Connection Bos "S-box". In this or another example, a coil of contactor 56 may have X2(−) and X1(+) connections for connecting to pins 7 and 6, respectively. Pin 7 may always have LV ground, and pin 6 may have 12 V applied when the contactor is desired to be closed and 12 V removed when the contactor is desired to be opened. In this or another example, there may be pins T1 and T2 of an NO switch or relay for connecting to pins 8 and 9, respectively. When a main contactor is closed, 12V may be applied through the NO contact to pin 9. Should any contactor freeze ON (typically caused by a high current welding the contacts together), The high voltage may be present on the output, with pin 6 not having 12V applied.

To ensure long life of the high-power connections of contactor 56, the contactor may be closed just prior to closing the S-box contactors and opened after the S-box contactors are opened.

FIG. 10 depicts electrical connections of a plurality of battery packs 50 configured in parallel and/or in series.

In some exemplary implementations, contactor 56 may be integrated as an additional contactor (e.g., adjacent to a positive connection or another connection). For example, contactor may be mounted at 90 degrees with an input on the panel, at 0 or 180 degrees in-line with the input, mounted inside cavity 53, or at another location near a panel of battery pack 50. For example, contactor 56 may be configured for a plug-in replacement of the MSD, at cavity 53 originally designed for the MSD, such that no modifications to battery pack 50 are needed. This example is depicted in FIGS. 7A-7B.

Figure 14:
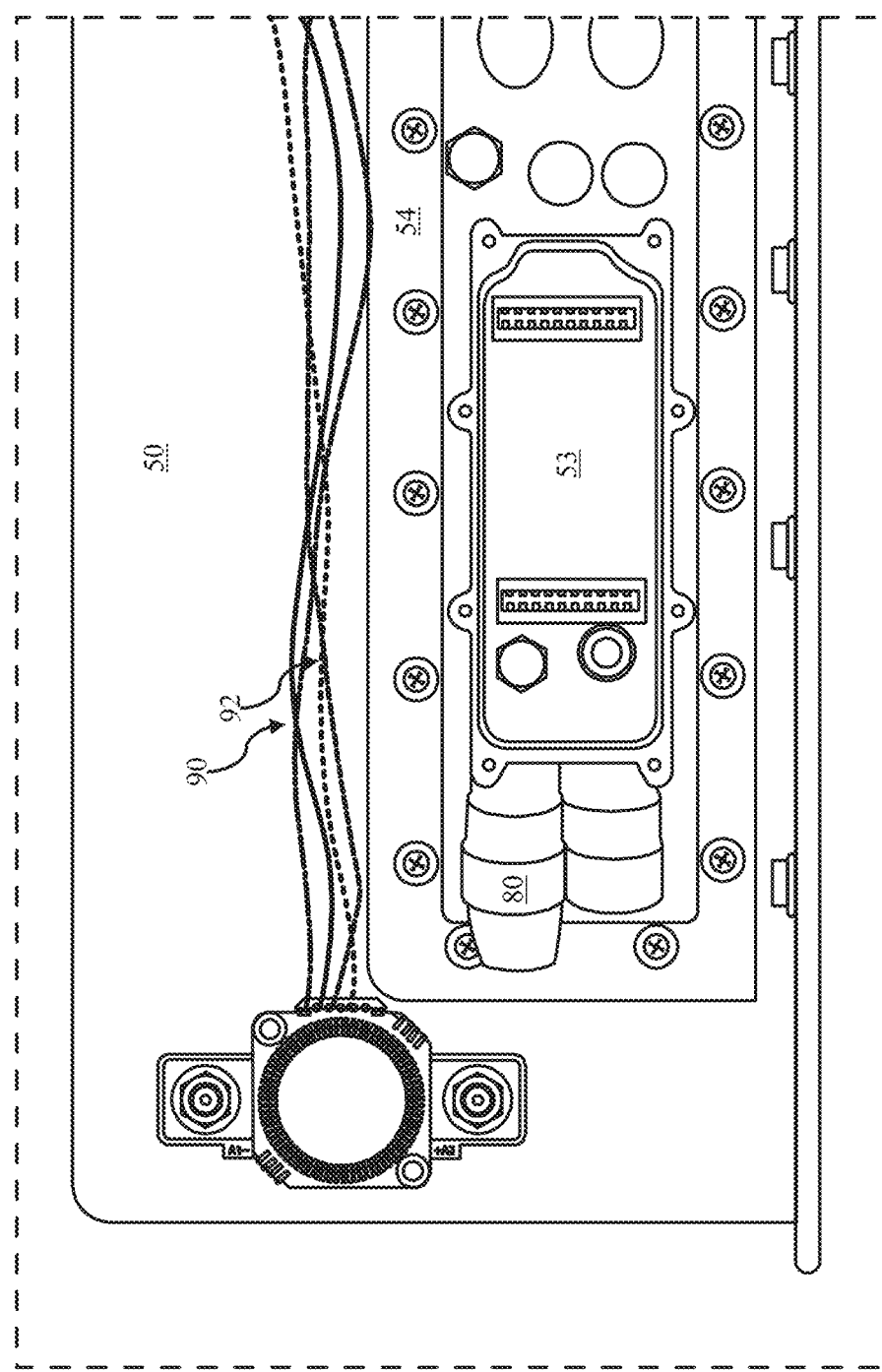
FIGS. 14-15 illustrate different ways of mounting a contactor to a surface of a battery pack or panel, in accordance with one or more embodiments.

FIG. 3A depicts contactor 56 having only HV connections 57 and LV coil connections 90. Thus, when contactor 56 is re-configured per the disclosed approach (as shown in FIG. 3B), LV position connections 92 may be added (as shown in the examples of FIGS. 3B and 14) and HV connections 57 may be modified for plugging directly into the MSD/fuse housing (specifically, at slots 51-52). In exemplary implementations having LV connections, a panel mount connector (as shown in FIG. 8) may be integrated into the new contactor housing, e.g., to waterproof these connections.

Figure 4:
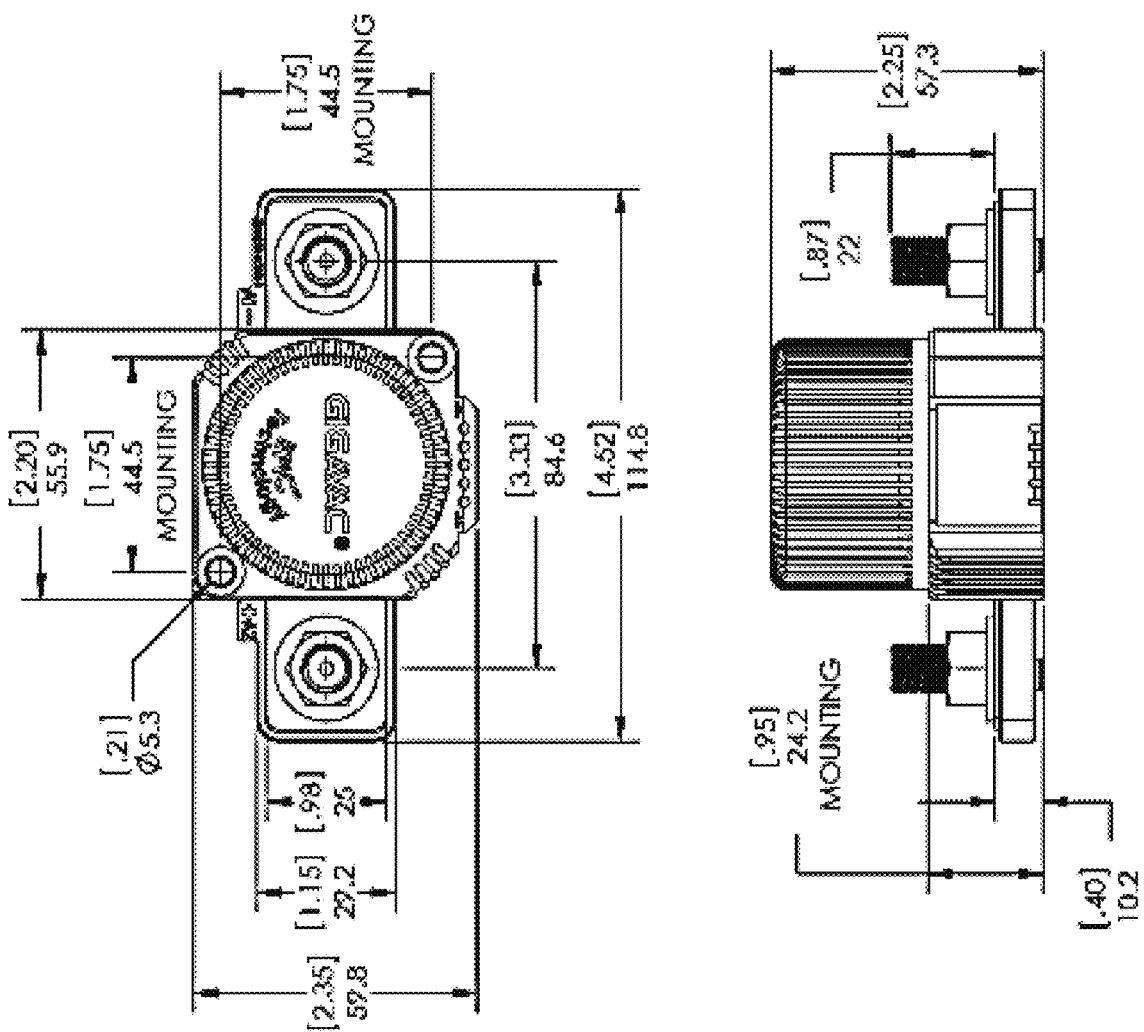
FIG. 4 illustrates two views of a contactor and its dimensions, in accordance with the prior art.

FIGS. 3A and 4 depict an HV contactor in a Gigavac GX14 style.

Figure 5:
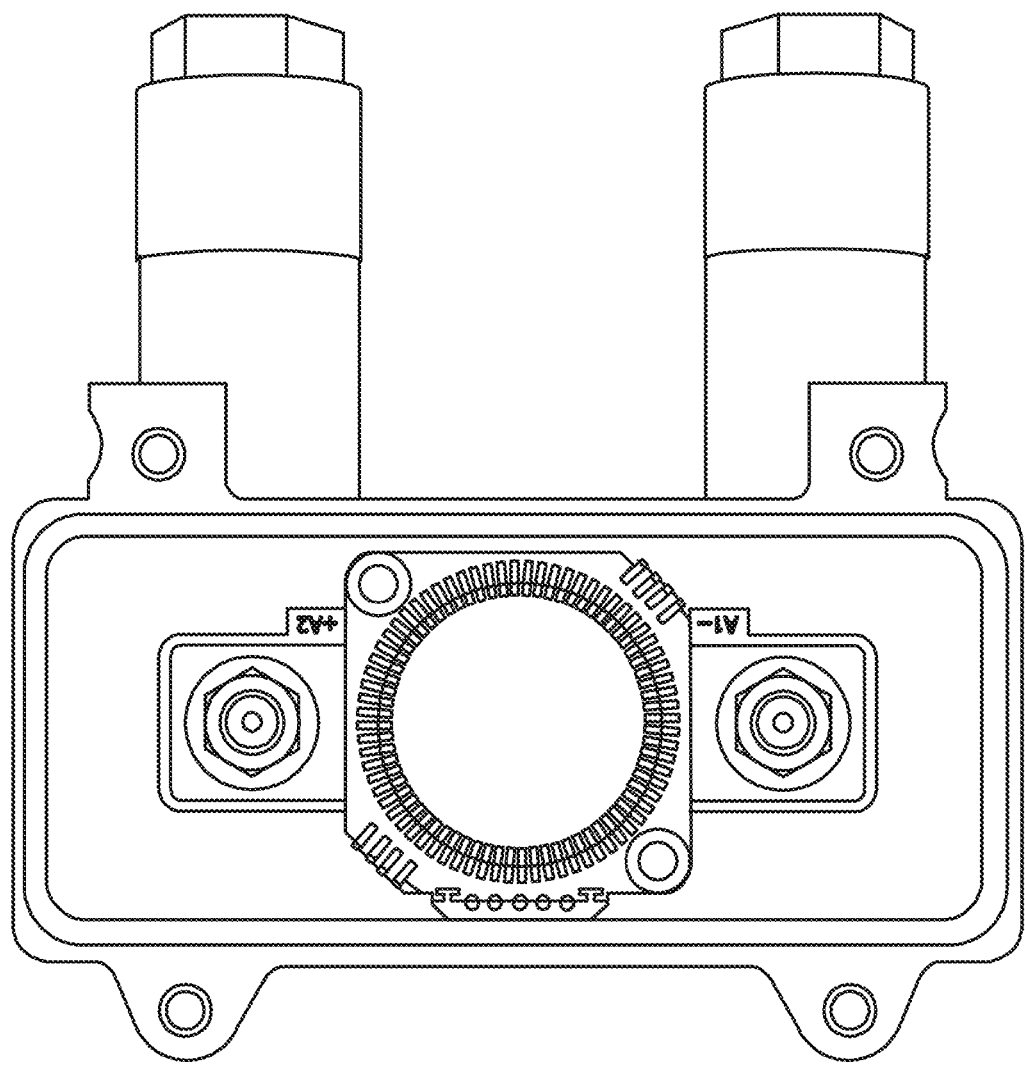
FIG. 5 illustrates an example of a contactor, in accordance with one or more embodiments.

FIG. 5 depicts an enlarged version of a battery pack's negative connection box with both terminals used; this configuration includes a shielded cover with gasket.

FIG. 13 depicts one example of a contactor external to the MSD cavity, e.g., with a new HV cable and connector for connecting the contactor to a vehicle. But, when integrating contactor 56 into cavity 53 as shown in FIGS. 7C & 14, the HV cable connections would remain unchanged (e.g., from connector 80 to the vehicle). Another difference of these exemplary implementations is that, whereas live wires are not added (demonstrable with respect to FIG. 7C) when a contactor is integrated under cover 55, adding a contactor onto plate 60 (as in FIGS. 13 and 16-19) may require a live connection outside of pack 50. Any cable external to the pack may potentially be subject to being compromised in the case that the vehicle is in a crash.

Figure 12:
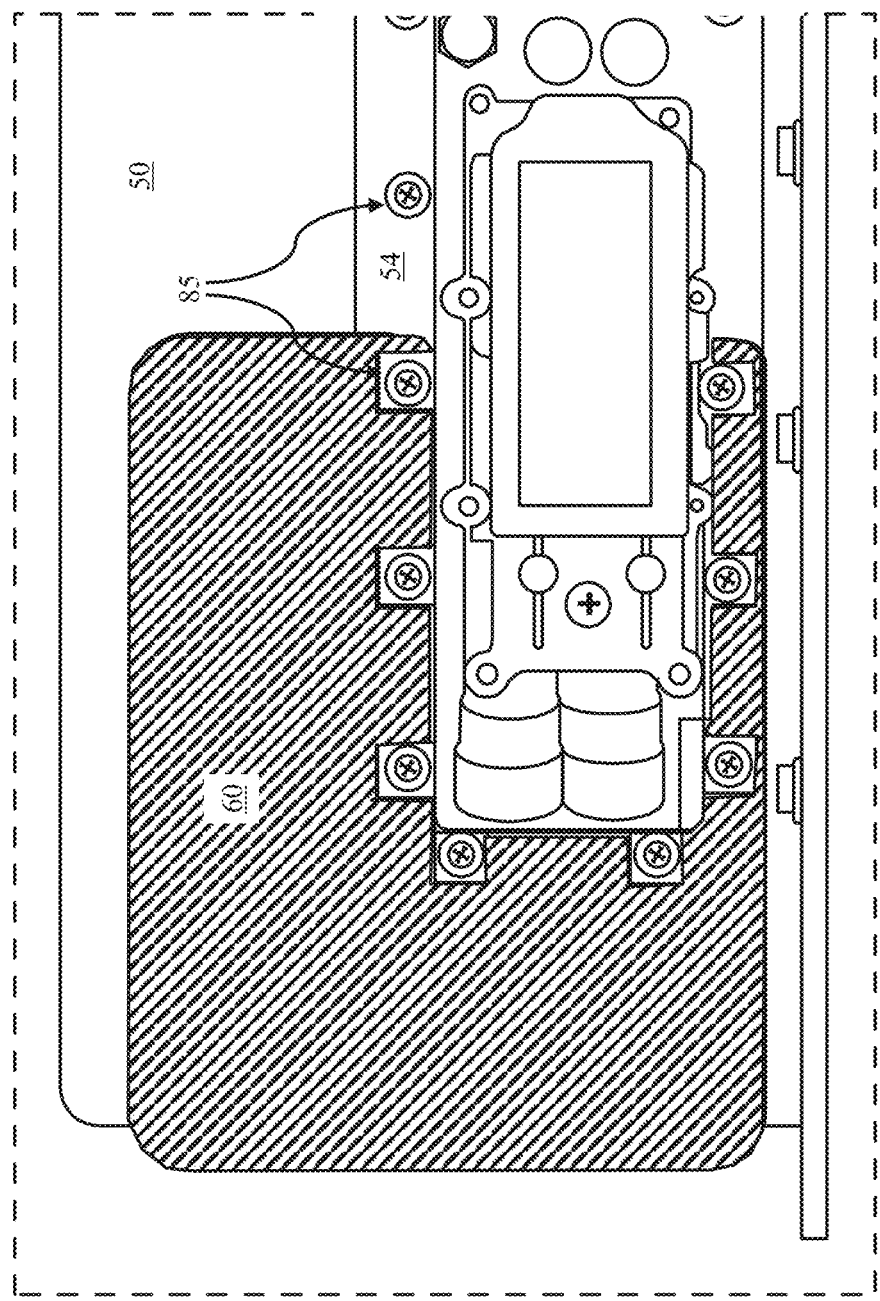
FIG. 12 illustrates an example of a mounting plate coupled to a battery pack, in accordance with one or more embodiments.

In some exemplary implementations, plate 60 may be installed over panel 54 using a same bolt pattern the panel used to mount onto battery pack 50, as shown in FIG. 12.

In some exemplary implementations, battery pack 50 may have a particular location where an MSD is mounted, and that location may be physically strong and/or able to handle shock and vibration (e.g., when cantilevering on a component having a weight). As such, the shock and vibration may easily be supported (i) by contactor 56 being integrated at cavity 53 or (ii) by contactor 56 being mounted on plate 60.

In exemplary implementations when integrated at the cavity, the contactor may be configured to fit therein and to support the high currents of the battery packs (e.g., 250 amps (A) continuous with peak currents of 600. A or more, depending on the particular pack types).

In some exemplary implementations, battery 50 may support contactor 56 as a surface mount component (SMC), but since the pack may have a composite material, mounting thereon may generate risk over time (e.g., with respect to failure via vibration). Accordingly, plate 60 may be developed for mounting contactor 56, since mounting the contactor directly onto the composite surface material of battery pack 50 (e.g., CATL pack) would fail in the presence of vibration because of the weight hanging off of it. In some exemplary implementations, plate 60 may be mounted onto pack 50 using at least some of the same mounting bolts or fasteners (e.g., through openings 85) used for securing panel 54 onto an end of the pack. And enclosure 62 may be developed to enclose the contactor when coupling them both onto the pack.

In some exemplary implementations, contactor 56 may be mounted external to cavity 53 on mounting plate 60. For example, the contactor may be mounted in housing 62, forming part of a new assembly. In this example, the mounting plate may be secured with at least some (e.g., eight, as shown in FIG. 12) existing fasteners (i.e., which were originally used for securing panel 54 on battery pack 50).

FIG. 13 depicts contactor 56 integrated onto mounting plate 60. As mentioned, the contactor may be mounted in housing 62 or another connection box. FIG. 14 depicts contactor 56 integrated onto mounting plate 60 in another configuration having a 90-degree turn, with the HV and LV wires extending outwards towards their destined connections. For example, HV wires 57 may connect to a vehicle's motor, whereas at least one of LV wires 90, 92 may connect (e.g., via a connector similar to that of FIG. 8) to connector 83B, as shown in FIG. 13.

FIG. 13 depicts an exemplary implementation wherein the contactor is an in-line configuration with the MSD. For example, the HV cable connection may come out connector 80, go through contactor 56, and then come out off to the right. As such, the cable may traverse a path resulting in a direction that is 180 degrees from the direction in which it used to go. This may not result in a simple, drop-in replacement.

Figure 15:
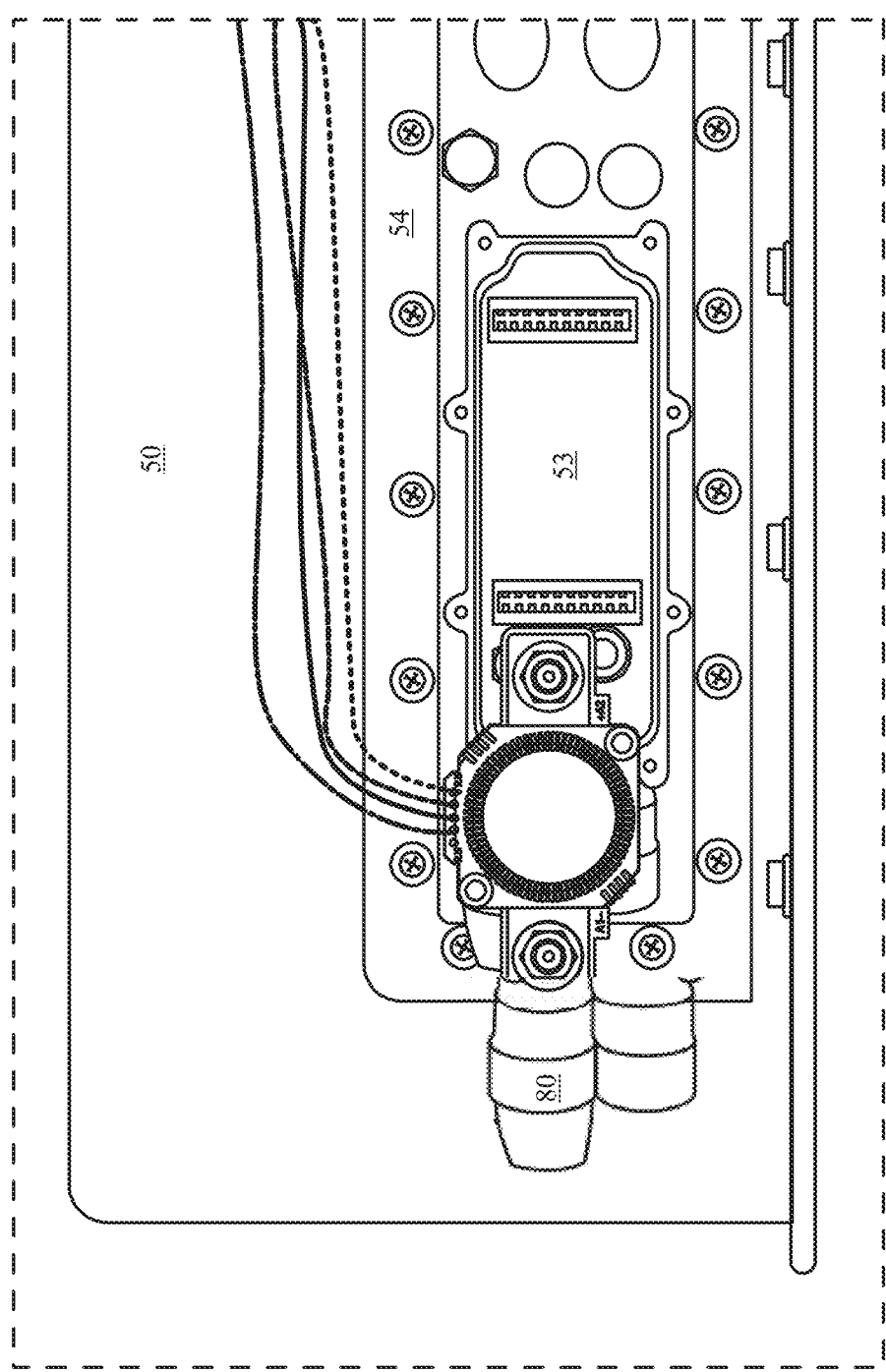

FIG. 14 depicts another exemplary implementation of coupling a contactor (e.g., via mounting plate 60 or directly via other means) to a surface of battery pack 50. FIG. 15 exemplarily depicts a similar implementation to that of FIG. 13 (e.g., with the contactor in-line with an MSD and connector 80 of panel 54). In the example of FIG. 15, no additional HV wiring may be needed for directly interposing the contactor.

FIG. 15 depicts contactor 56 integrated onto mounting plate 60 in an in-line configuration.

Figure 16:
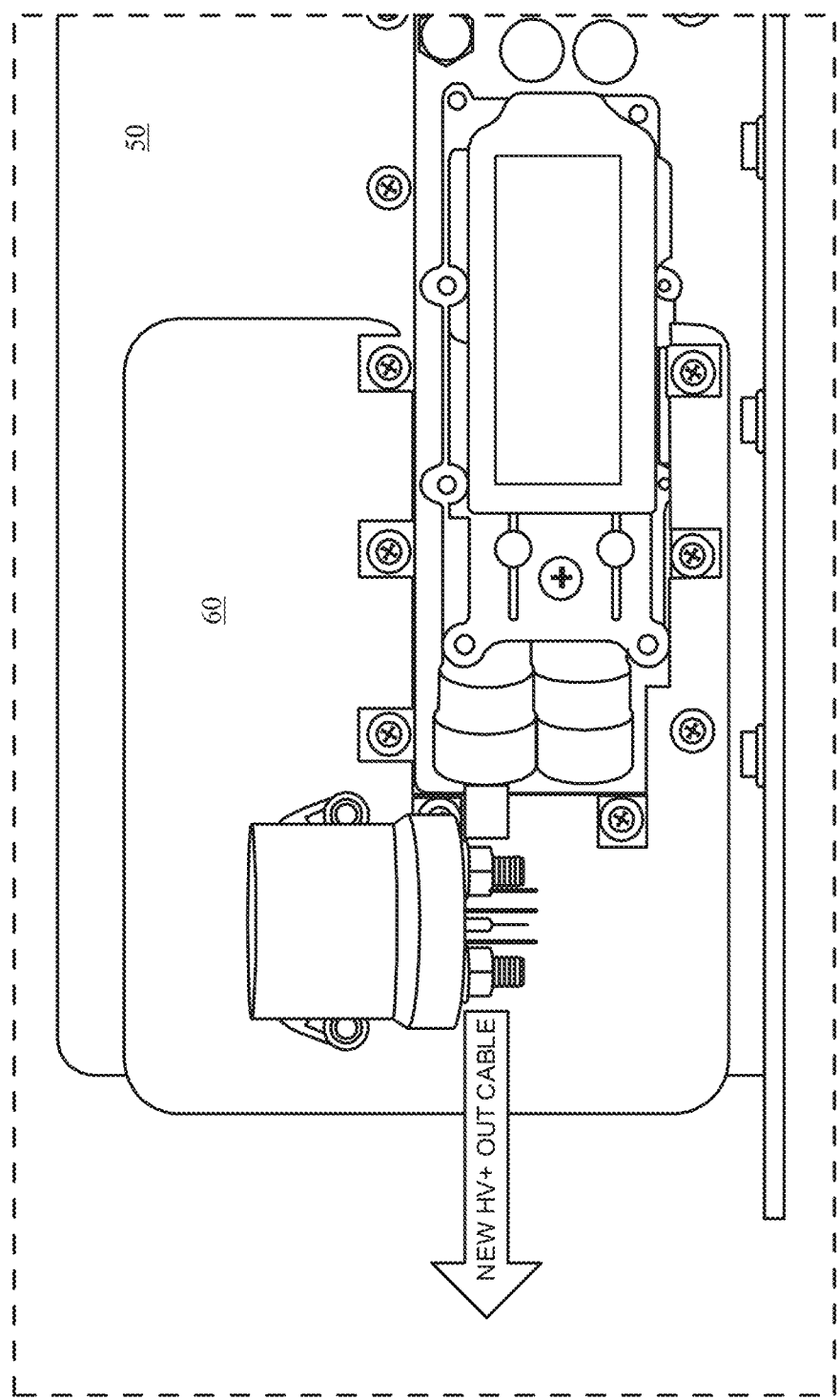
FIGS. 16-17 illustrate different views of an example of a contactor mounted close to a power connector of a battery pack, in accordance with one or more embodiments.
Figure 17:
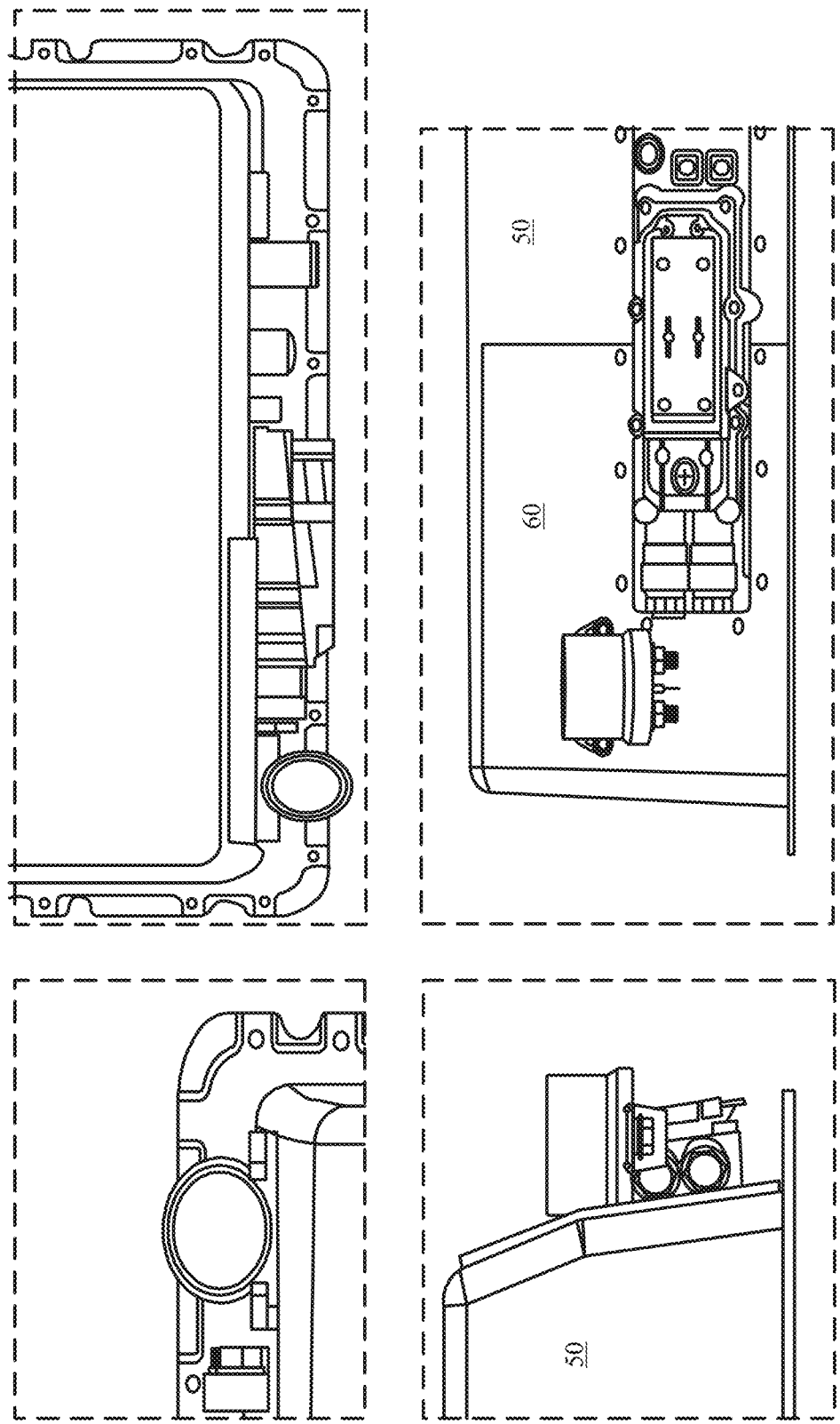

FIGS. 16-17 depict yet another exemplary implementation of an in-line contactor using mounting plate 60. FIG. 16 depicts contactor 56 as a GV242 style contactor. More particularly, the contactor may be mounted at a 90-degree side-turn. In this configuration, the terminals on the contactor may be too far out from the pack surface to align the cable directly. And the contactor may also protrude further over an end of pack 50. FIG. 17 depicts different views of the computer aided design (CAD) drawing of the configuration of FIG. 16.

Figure 18:
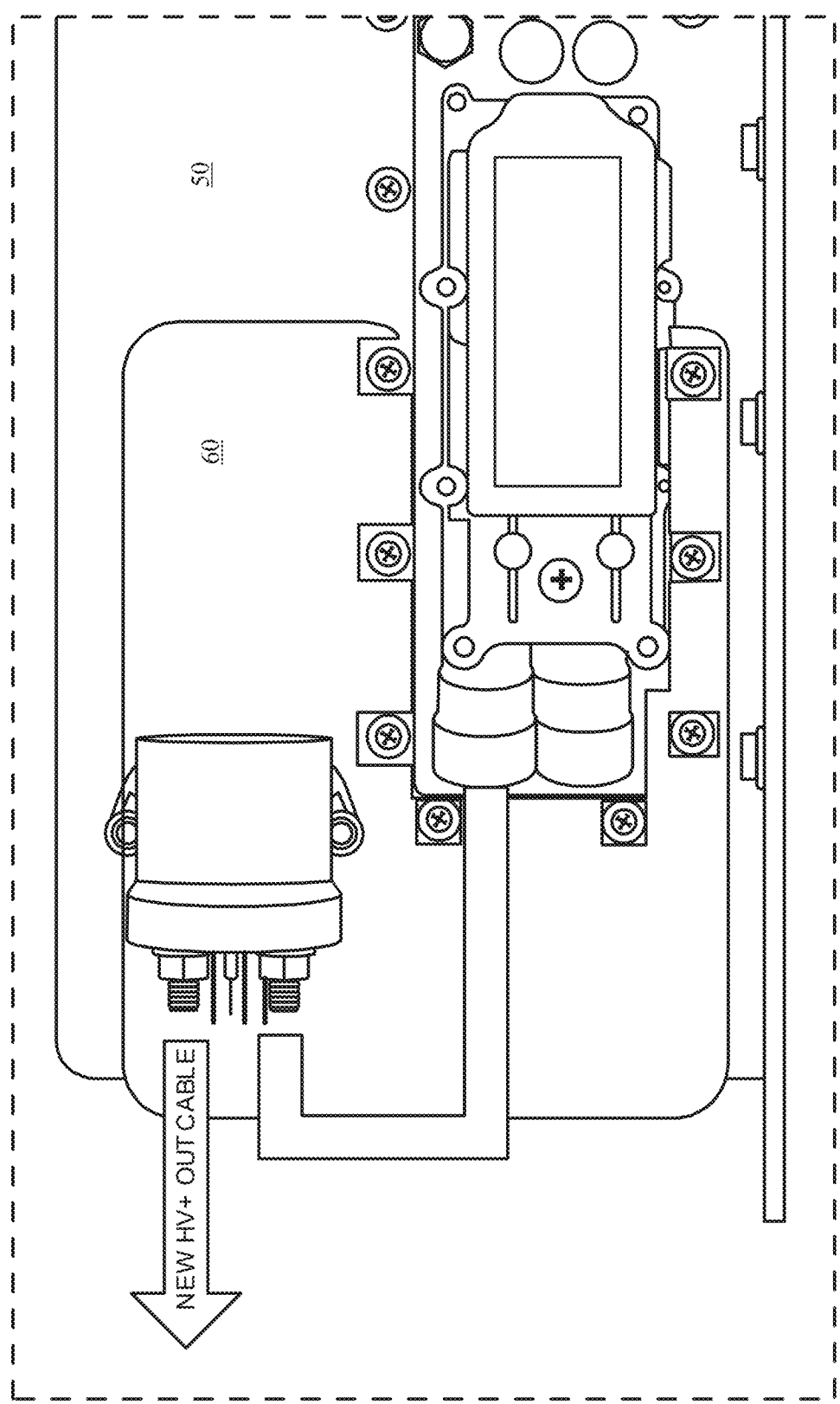
FIGS. 18-19 illustrate an example of a contactor mounted on a mounting plate above a panel of a battery pack, in accordance with one or more embodiments.
Figure 19:
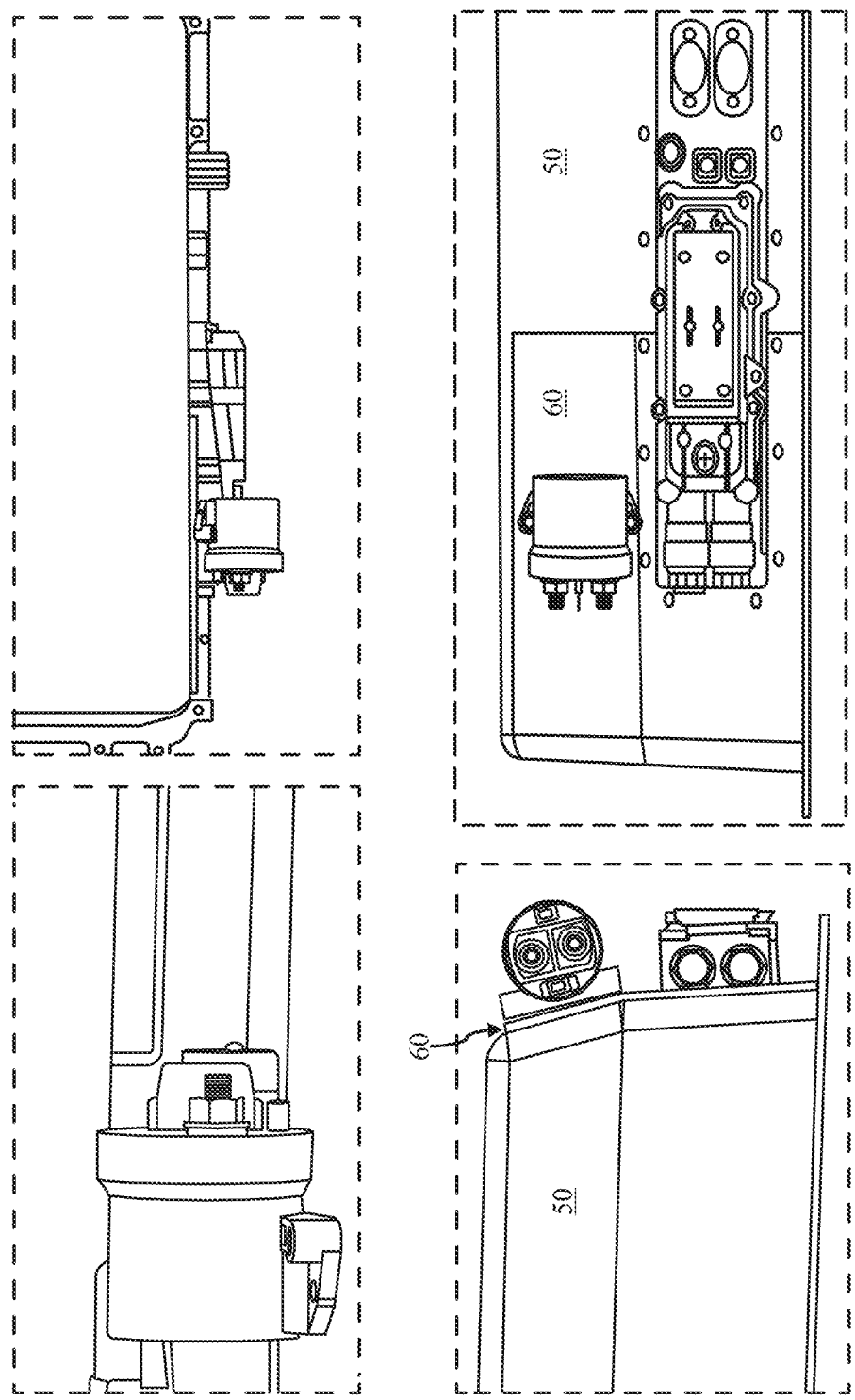

FIGS. 18-19 depict yet another exemplary implementation of an in-line contactor using mounting plate 60, with (i) more complex routing due to the 180 degree turn and (ii) more compact horizontal protrusion or horizontal extent (e.g., in comparison with the similar example of FIGS. 16-17). In an example, terminals on the contactor may extend too far out from the pack's surface to align the cable directly. The contactor may stick out beyond an end of the pack, in this example.

Figure 2:
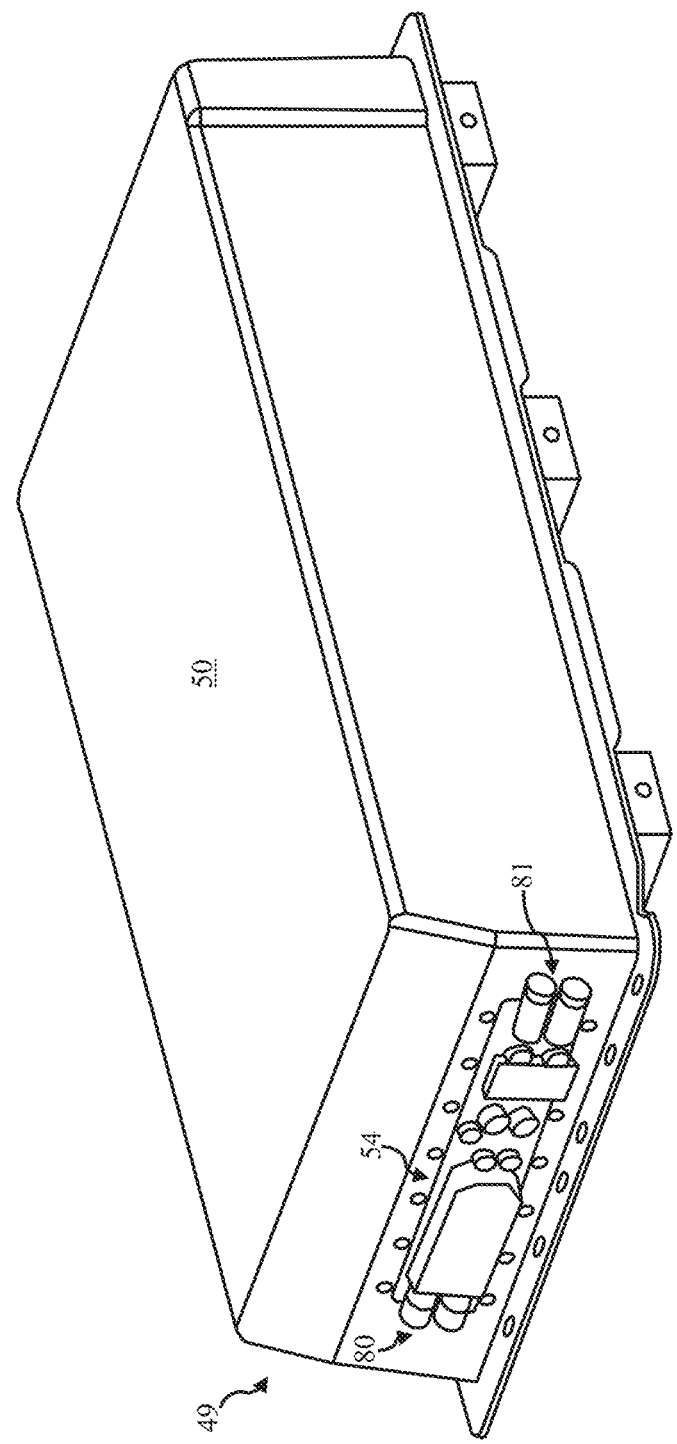
FIG. 2 illustrates an example of a battery pack, in accordance with the prior art.

FIGS. 17 and 19 show different implementations of where a contactor may be added to pack 50. In the example of FIG. 17, particularly the upper-right corner, the contactor may problematically extend beyond the pack. Other exemplary implementations disclosed herein may thus address this problem by preventing the added contactor to extend beyond an envelope of the pack. For example, the bottom-left image of FIG. 19 depicts leveraging a curve on an upper portion of battery pack 50 to mount the contactor on a portion of plate 60 such that the horizontal envelope is not lengthened. This curve (e.g., at front surface 49) is also depicted in the example of FIG. 2.

FIG. 18 also depicts contactor 56 as a GV242 style contactor. More particularly, the contactor may be mounted with a different amount of rotation from FIG. 16. In this configuration, more complex wire routing may be needed, but it may be more compact (e.g., in the comparison with FIGS. 16-17). When turned 180 degrees, this contactor configuration may work well with certain battery packs. FIG. 19 depicts different views of the CAD drawings of the configuration of FIG. 18.

FIG. 20 depicts an isometric view of mounting plate 60, which is coupled to panel 54 using a subset of existing fasteners used to affix panel 54 to pack 50. This example configuration is similar to the one depicted in FIG. 12. Exemplary dimensions are shown in the depiction to the right of this isometric drawing in FIG. 20. As such, there is available space to incorporate mounting plate 60 on which HV contactor 56 with housing 62 can be mounted.

FIG. 21 depicts housing 62 for HV contactor 56, in implementations when the contactor does not directly replace an MSD. More particularly, housing 62 may be designed based on the HV contactor dimensions (depicted in FIG. 4). As such, contactor 56 in its custom housing may fit on mounting plate 60.

Figure 22:
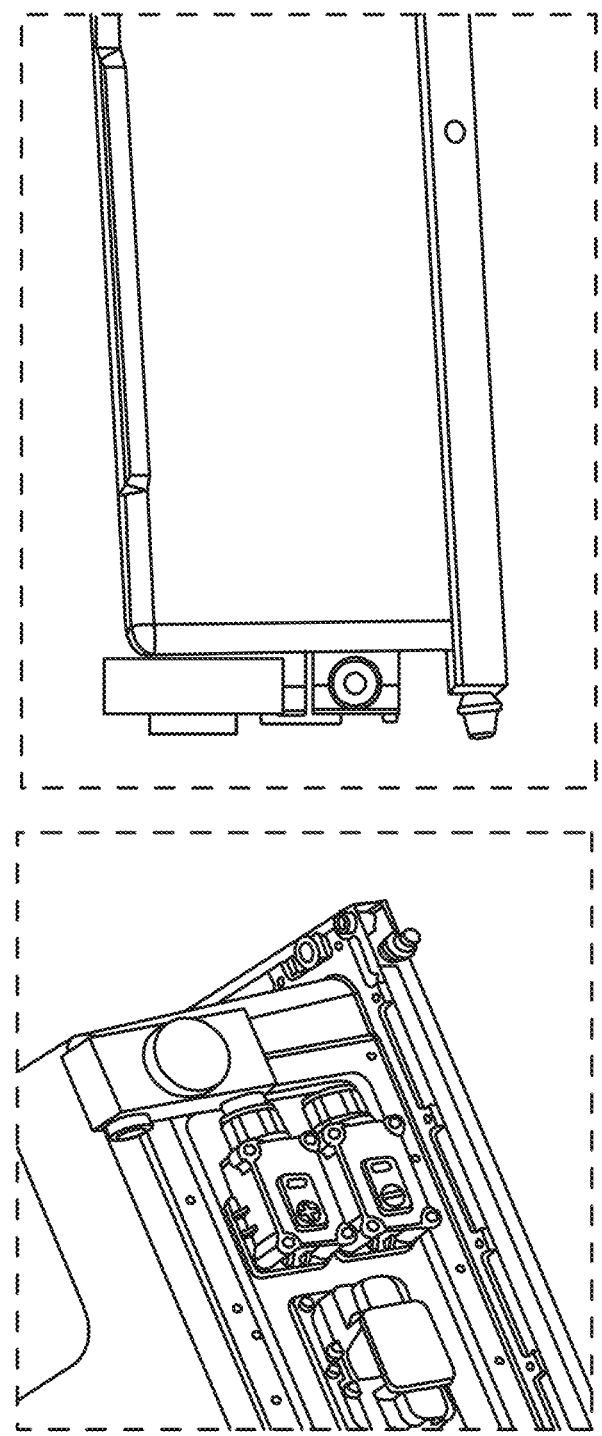
FIGS. 22-24 illustrate examples of a housed contactor mounted in relation to a battery pack, in accordance with one or more embodiments.
Figure 23:
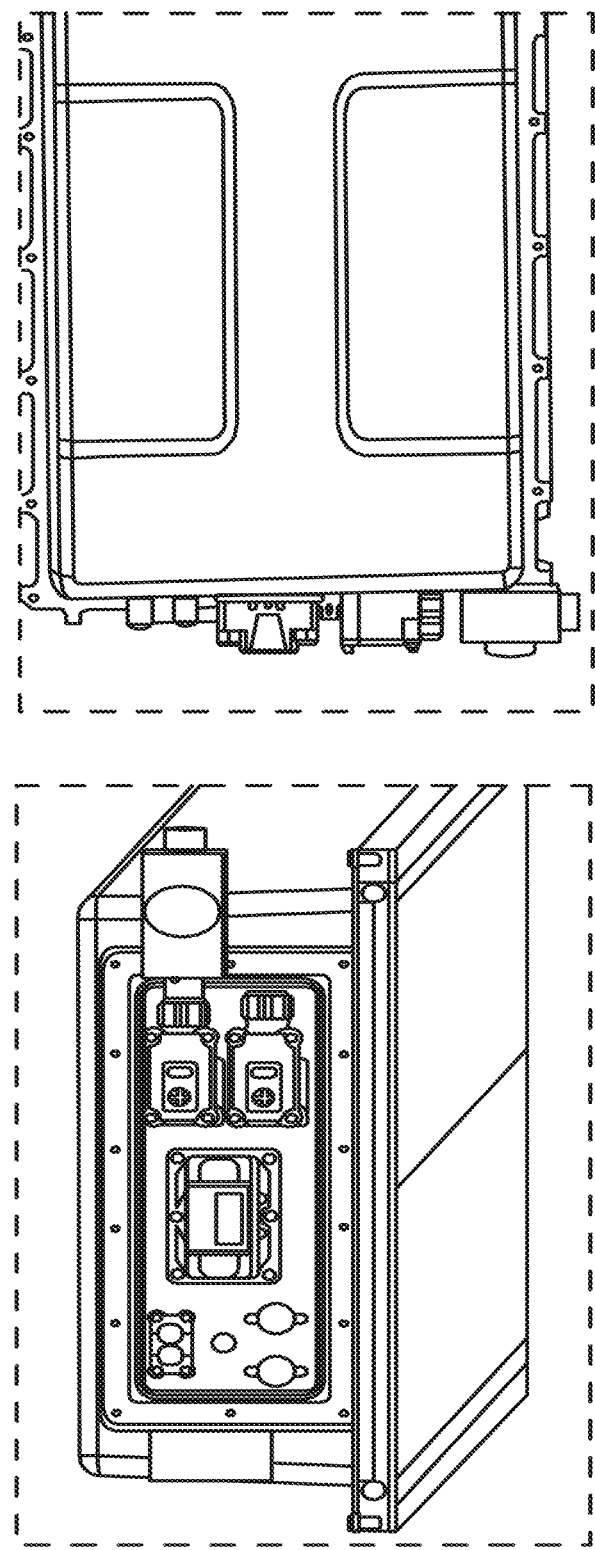

In some exemplary implementations, housing 62 depicted in the example of FIG. 21 may be mounted at a corner of pack 50, as depicted in FIG. 22, or alternatively near the corner, as depicted in FIG. 23. A problem may occur when HV contactor in housing 62 extends beyond an outside surface of a face of battery 50. The example of FIGS. 24-25 depict yet another alternative for mounting contactor 56 when in housing 62; more particularly, external wiring may be needed and routed, via one or more turns, to connect between the contactor and power connector 80 (or 81) of panel 54.

FIG. 22 depicts two different views of yet another exemplary implementation, particularly in which a contactor is directly coupled to a terminal of battery pack 50 while extending upwards in a 90-degree direction. FIG. 23 similarly depicts two different views of yet another exemplary implementation, particularly in which a contactor is directly coupled to a terminal of battery pack 50 while extending outwards in a same direction.

Figure 24:
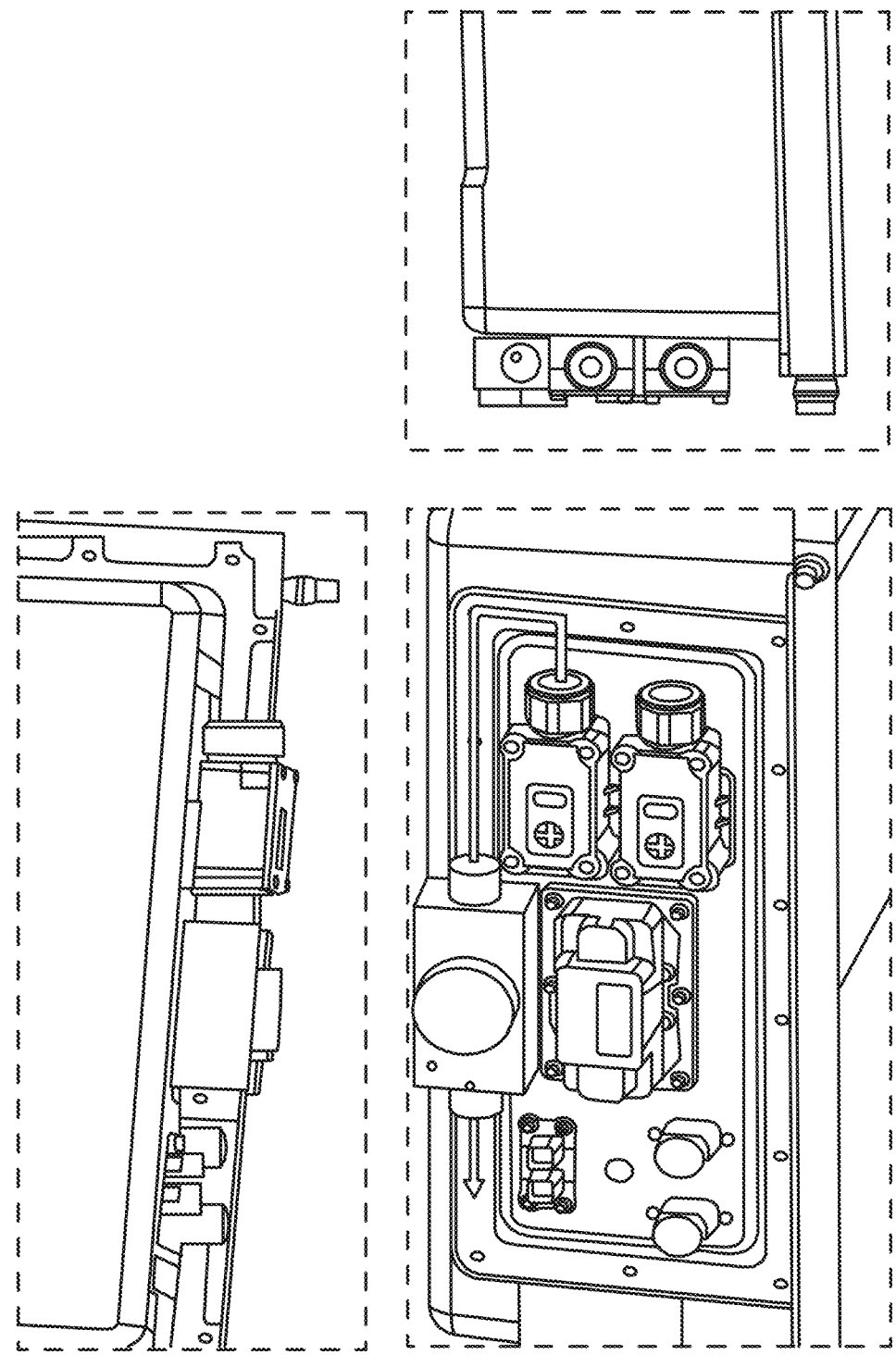
Figure 25:
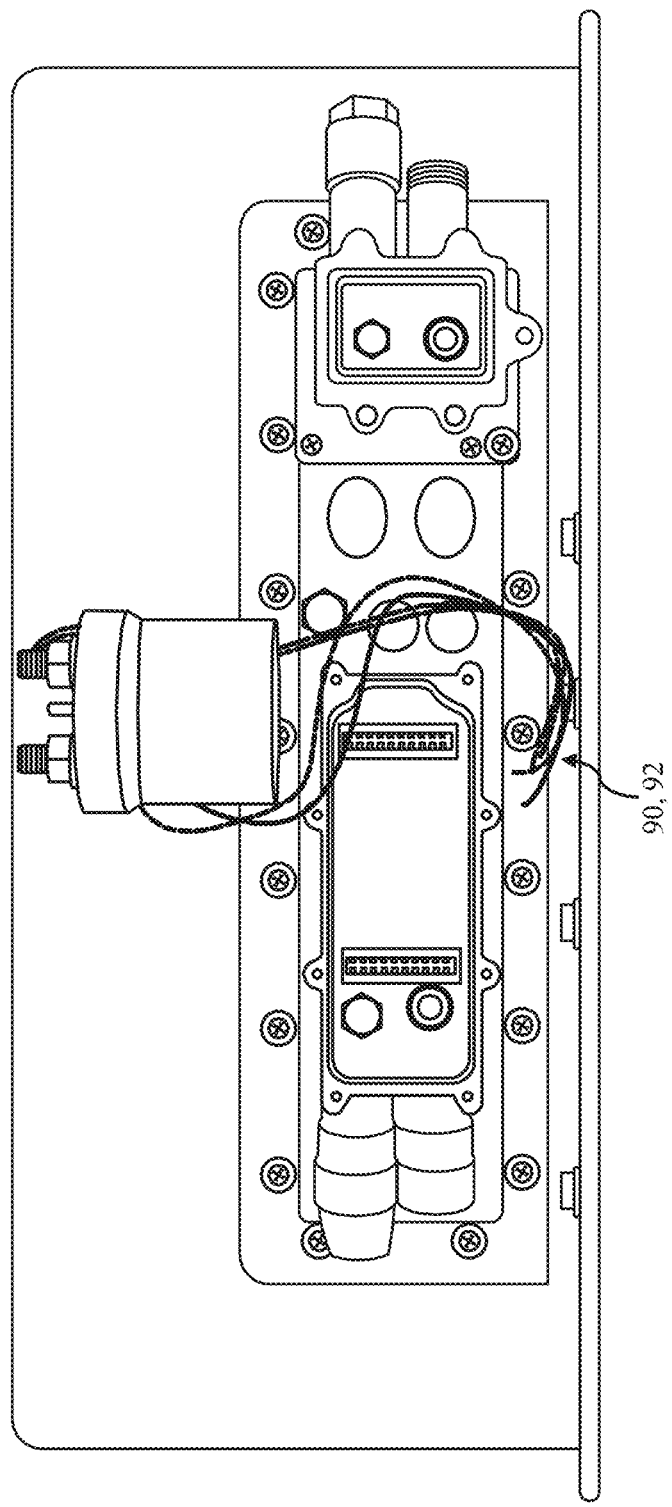
Figure 27:
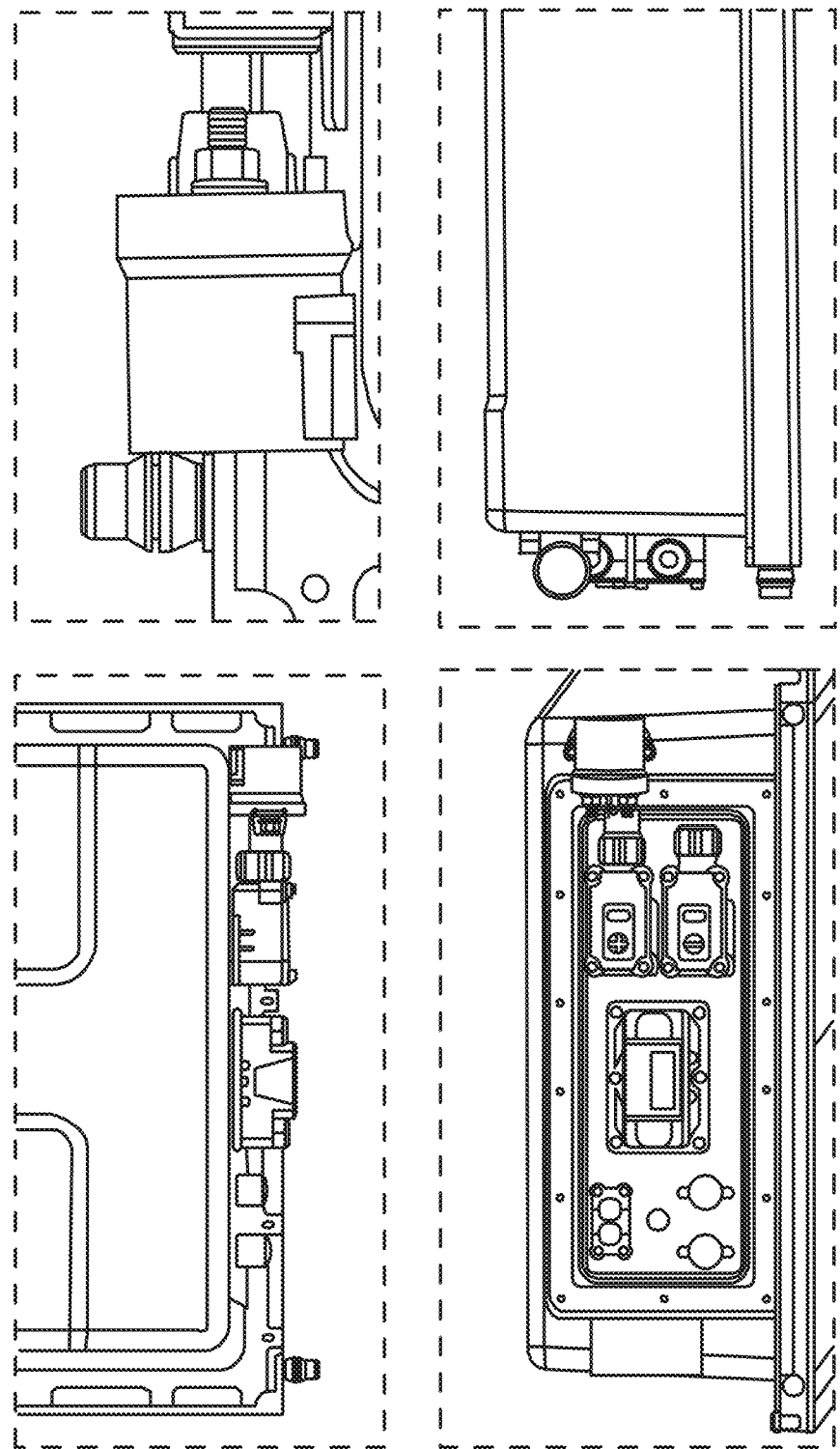

FIG. 24 depicts three different views of yet another exemplary implementation, particularly in which a contactor is indirectly (e.g., via cabling at each end, one end of which making downward 90 degree turns) coupled to a terminal of battery pack 50.

Figure 28:
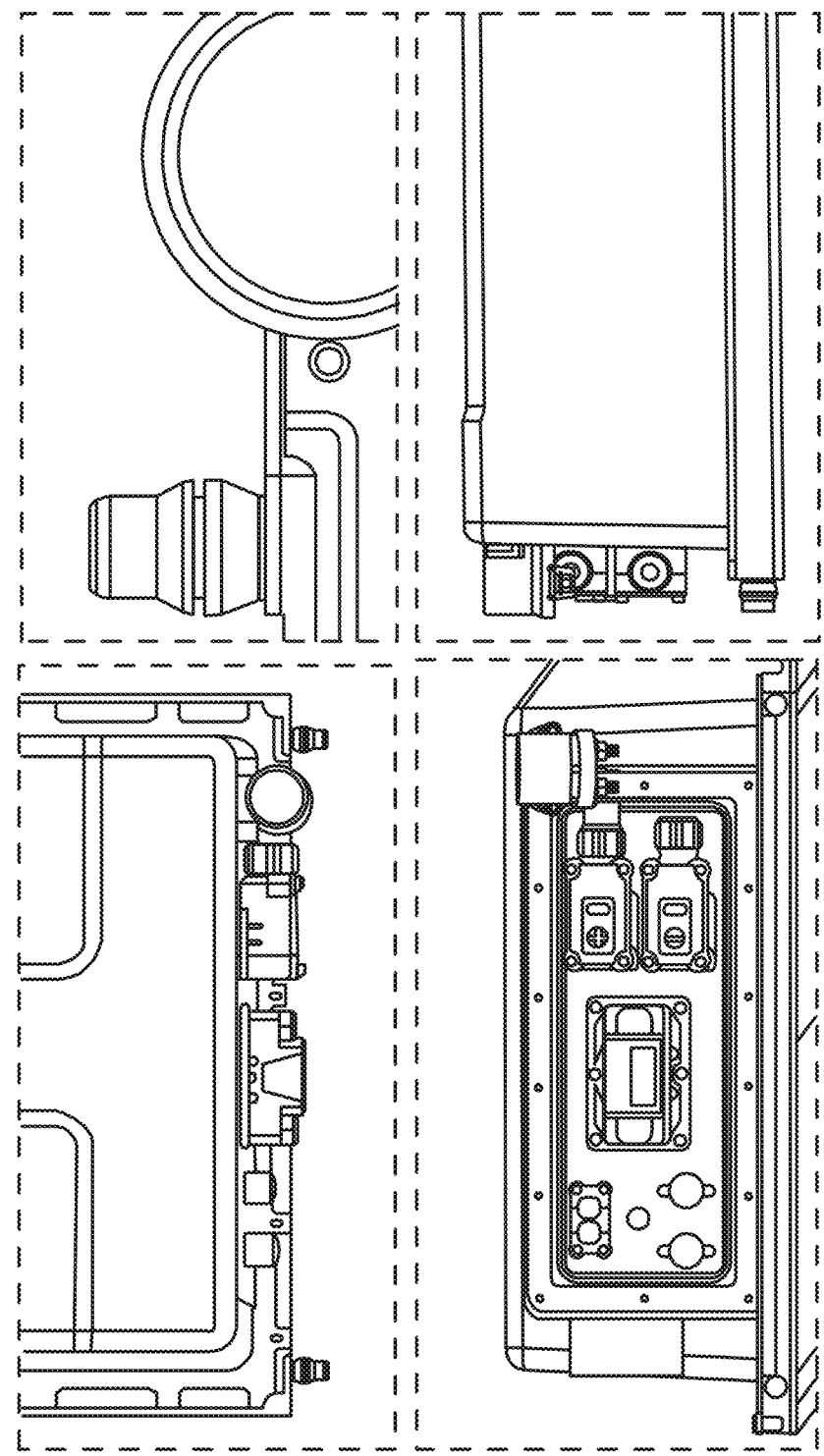

FIGS. 25-28 depict other examples of coupling a contactor to battery pack 50. In the example of FIG. 28, there may not be enough space to accommodate the contactor and its casing, the contactor being mounted via an additional mounting surface.

Electronic storage 22 of FIG. 1 comprises electronic storage media that electronically stores information. The electronic storage media of electronic storage 22 may comprise system storage that is provided integrally (i.e., substantially non-removable) with system 10 and/or removable storage that is removably connectable to system 10 via, for example, a port (e.g., a USB port, a firewire port, etc.) or a drive (e.g., a disk drive, etc.). Electronic storage 22 may be (in whole or in part) a separate component within system 10, or electronic storage 22 may be provided (in whole or in part) integrally with one or more other components of system 10 (e.g., a user interface (UI) device 18, processor 20, etc.). In some embodiments, electronic storage 22 may be located in a server together with processor 20, in a server that is part of external resources 24, in UI devices 18, and/or in other locations. Electronic storage 22 may comprise a memory controller and one or more of optically readable storage media (e.g., optical disks, etc.), magnetically readable storage media (e.g., magnetic tape, magnetic hard drive, etc.), electrical charge-based storage media (e.g., EPROM, RAM, etc.), solid-state storage media (e.g., flash drive, etc.), and/or other electronically readable storage media. Electronic storage 22 may store software algorithms, information obtained and/or determined by processor 20, information received via UI devices 18 and/or other external computing systems, information received from external resources 24, and/or other information that enables system 10 to function as described herein.

External resources 24 may include sources of information (e.g., databases, websites, etc.), external entities participating with system 10, one or more servers outside of system 10, a network, electronic storage, equipment related to Wi-Fi technology, equipment related to Bluetooth® technology, data entry devices, a power supply (e.g., battery powered or line-power connected, such as directly to 110 volts AC or indirectly via AC/DC conversion), a transmit/receive element (e.g., an antenna configured to transmit and/or receive wireless signals), a network interface controller (NIC), a display controller, a graphics processing unit (GPU), and/or other resources. In some implementations, some or all of the functionality attributed herein to external resources 24 may be provided by other components or resources included in system 10. Processor 20, external resources 24, UI device 18, electronic storage 22, a network, and/or other components of system 10 may be configured to communicate with each other via wired and/or wireless connections, such as a network (e.g., a local area network (LAN), the Internet, a wide area network (WAN), a radio access network (RAN), a public switched telephone network (PSTN), etc.), cellular technology (e.g., GSM, UMTS, LTE, 5G, etc.), Wi-Fi technology, another wireless communications link (e.g., radio frequency (RF), microwave, infrared (IR), ultraviolet (UV), visible light, cm wave, mm wave, etc.), a base station, and/or other resources.

UI device(s) 18 of system 10 may be configured to provide an interface between one or more users and system 10. UI devices 18 are configured to provide information to and/or receive information from the one or more users. UI devices 18 include a UI and/or other components. The UI may be and/or include a graphical UI configured to present views and/or fields configured to receive entry and/or selection with respect to particular functionality of system 10, and/or provide and/or receive other information. In some embodiments, the UI of UI devices 18 may include a plurality of separate interfaces associated with processors 20 and/or other components of system 10. Examples of interface devices suitable for inclusion in UI device 18 include a touch screen, a keypad, touch sensitive and/or physical buttons, switches, a keyboard, knobs, levers, a display, speakers, a microphone, an indicator light, an audible alarm, a printer, and/or other interface devices. The present disclosure also contemplates that UI devices 18 include a removable storage interface. In this example, information may be loaded into UI devices 18 from removable storage (e.g., a smart card, a flash drive, a removable disk) that enables users to customize the implementation of UI devices 18.

In some embodiments, UI devices 18 are configured to provide a UI, processing capabilities, databases, and/or electronic storage to system 10. As such, UI devices 18 may include processors 20, electronic storage 22, external resources 24, and/or other components of system 10. In some embodiments, UI devices 18 are connected to a network (e.g., the Internet). In some embodiments, UI devices 18 do not include processor 20, electronic storage 22, external resources 24, and/or other components of system 10, but instead communicate with these components via dedicated lines, a bus, a switch, network, or other communication means. The communication may be wireless or wired. In some embodiments, UI devices 18 are laptops, desktop computers, smartphones, tablet computers, and/or other UI devices.

Data and content may be exchanged between the various components of the system 10 through a communication interface and communication paths using any one of a number of communications protocols. In one example, data may be exchanged employing a protocol used for communicating data across a packet-switched internetwork using, for example, the Internet Protocol Suite, also referred to as TCP/IP. The data and content may be delivered using datagrams (or packets) from the source host to the destination host solely based on their addresses. For this purpose, the Internet Protocol defines addressing methods and structures for datagram encapsulation. Of course, other protocols also may be used. Examples of an Internet protocol include Internet Protocol version 4 (IPv4) and Internet Protocol version 6 (IPv6).

In some embodiments, processor(s) 20 may form part (e.g., in a same or separate housing) of a user device, a consumer electronics device, a mobile phone, a smartphone, a personal data assistant, a digital tablet/pad computer, a wearable device (e.g., watch), augmented reality (AR) goggles, virtual reality (VR) goggles, a reflective display, a personal computer, a laptop computer, a notebook computer, a work station, a server, a high performance computer (HPC), a vehicle (car, truck, bus, etc.), train, boat, a game or entertainment system, a set-top-box, a monitor, a television (TV), a panel, a space craft, or any other device that implements a battery system, an electric motor, lighting, heating, capacitor banks, thermal evaporators, or another electrical load.

In some embodiments, processor 20 is configured to provide information processing capabilities in system 10. Processor 20 may comprise one or more of a digital processor, an analog processor, a digital circuit designed to process information, an analog circuit designed to process information, a state machine, and/or other mechanisms for electronically processing information. Although processor 20 is shown in FIG. 1 as a single entity, this is for illustrative purposes only. In some embodiments, processor 20 may comprise a plurality of processing units. These processing units may be physically located within the same device (e.g., a server), or processor 20 may represent processing functionality of a plurality of devices operating in coordination (e.g., one or more servers, UI devices 18, devices that are part of external resources 24, electronic storage 22, and/or other devices).

As shown in FIG. 1, processor 20 is configured via machine-readable instructions to execute one or more computer program components. The computer program components may comprise one or more of information component 30, battery management component 32, vehicle control component 34, contactor coordination component 36, and/or other components. Processor 20 may be configured to execute components 30, 32, 34, and/or 36 by: software; hardware; firmware; some combination of software, hardware, and/or firmware; and/or other mechanisms for configuring processing capabilities on processor 20.

It should be appreciated that although components 30, 32, 34, and 36 are illustrated in FIG. 1 as being co-located within a single processing unit, in embodiments in which processor 20 comprises multiple processing units, one or more of components 30, 32, 34, and/or 36 may be located remotely from the other components. For example, in some embodiments, each of processor components 30, 32, 34, and 36 may comprise a separate and distinct set of processors. The description of the functionality provided by the different components 30, 32, 34, and/or 36 described below is for illustrative purposes, and is not intended to be limiting, as any of components 30, 32, 34, and/or 36 may provide more or less functionality than is described. For example, one or more of components 30, 32, 34, and/or 36 may be eliminated, and some or all of its functionality may be provided by other components 30, 32, 34, and/or 36. As another example, processor 20 may be configured to execute one or more additional components that may perform some or all of the functionality attributed below to one of components 30, 32, 34, and/or 36.

FIG. 29 illustrates method 100 for integrating a plug-in contactor (e.g., in substantially a same housing or form factor as an existing MSD), in accordance with one or more embodiments. Method 100 may be performed with a computer system comprising one or more computer processors and/or other components. The processors are configured by machine readable instructions to execute computer program components. The operations of method 100 presented below are intended to be illustrative. In some embodiments, method 100 may be accomplished with one or more additional operations not described, and/or without one or more of the operations discussed. Additionally, the order in which the operations of method 100 are illustrated in FIG. 29 and described below is not intended to be limiting. In some embodiments, method 100 may be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of method 100 in response to instructions stored electronically on an electronic storage medium. The processing devices may include one or more devices configured through hardware, firmware, and/or software to be specifically designed for execution of one or more of the operations of method 100.

At operation 102 of method 100, a battery pack, which includes an installed MSD, may be provided. In some embodiments, operation 102 is performed by an OEM and/or distributor.

At operation 104 of method 100, the MSD may be rendered non-functional, by cutting a busbar it comprises in half. As an example, a bus bar may be cut into two or more pieces. In some embodiments, operation 104 is performed by a technician.

At operation 106 of method 100, a contactor may be configured to be electrically connected at sockets originally designed for the MSD. As an example, prongs 57C-57D of contactor 56 may be inserted into slots 51-52. In some embodiments, operation 106 is performed by a technician.

At operation 108 of method 100, a gasket may be provided for sealing from moisture such that the contactor, when installed, satisfies a same, original IP rating of the battery pack. As an example, existing bolt pattern 86 used for the MSD's cover may be used by cover 55 when integrating underneath contactor 56. In some embodiments, operation 108 is performed by a technician.

At operation 110 of method 100, the MSD may be replaced with the contactor, without substantially adjusting a form factor of the installation. In some embodiments, operation 110 is performed by a technician and subsequent control of the installed contactor may be performed via contactor coordination component 36.

Processors suitable for the control of contactor 56 may include, by way of example, both general and special purpose microprocessors, and any one or more processors of any kind of digital computer. Generally, a processor will receive instructions and data from a read-only memory or a random-access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, such as, magnetic, magneto-optical disks, or optical disks. Information carriers suitable for embodying computer program instructions and data include all forms of non-volatile memory, including by way of example semiconductor memory devices, such as, EPROM, EEPROM, and flash memory devices; magnetic disks, such as, internal hard disks or removable disks; magneto-optical disks; and CD-ROM and DVD-ROM disks. The processor and the memory can be supplemented by or incorporated in special purpose logic circuitry.

It will be understood that various aspects or details of the disclosures may be changed combined or removed without departing from the scope of the invention. It is not exhaustive and does not limit the claimed inventions to the precise form disclosed. Furthermore, the foregoing description is for the purpose of illustration only, and not for the purpose of limitation. Modifications and variations are possible in light of the above description or may be acquired from practicing the invention. The claims and their equivalents define the scope of the invention.

What is claimed is:

1. A method for replacing a manual service disconnect (MSD) of a mobile power supply, the method comprising:
   providing a set of batteries configured as a mobile power supply which includes an MSD;
   removing the MSD from the mobile power supply;
   providing a contactor which is configured to be electrically connected at sockets originally designed for the MSD;
   installing the contactor in place of the MSD; and,
   providing a seal for sealing an environment from external humidity or moisture such that the installed contactor satisfies a similar ingress protection (IP) rating as the MSD on the set of batteries.

2. The method of claim 1, wherein a front surface of the contactor is integrated in a cavity previously containing the MSD.

3. The method of claim 1, wherein the contactor is a high voltage switch or relay, for disabling a high-voltage and/or high-current power source.

4. The method of claim 3, the method further comprising;
   a controller; and,
   wherein high voltage is removed from the contactor based on an output of a sensor received by the controller.

5. The method of claim 3, the method further comprising:
   providing a controller; and,
   wherein the contactor is disabled by the controller based on an output of a sensor indicating an over-voltage or over-current event.

6. The method of claim 3, the method further comprising the contactor is actuated based on a low voltage signal being applied to a coil to perform at least one of a pull-in or release-of the contactor.

7. The method of claim 1, the method comprising;
   wherein a computing device that controls the contactor has a predetermined location, the controlling being performed based on a coordination between (i) a battery management system (BMS), (ii) a vehicle control unit (VCU), and (iii) another control unit that obtains an output from a crash sensor.

8. The method of claim 1, wherein the seal is a gasket.

9. A method for replacing a manual service disconnect (MSD) of a mobile power supply, the method comprising:
   providing a set of batteries configured as a mobile power supply which includes an MSD;
   removing the MSD from the mobile power supply;
   configuring a contactor to be electrically connected at sockets originally designed for the MSD;
   installing the contactor in place of the MSD in said mobile power supply;
   wherein a rear surface of the contactor is coupled to a cover plate that has substantially a same form factor as a cover plate of the MSD;
   wherein the MSD comprises a bus bar or fuse.

10. A method for replacing a manual service disconnect (MSD) of a mobile power supply, the method comprising:
    providing a mobile power supply including at least a set of batteries that include an MSD;
    removing the MSD from a cavity connected to the mobile power supply;
    installing a contactor in the cavity previously containing the MSD;
    providing a seal for sealing the contactor environment from external humidity or moisture such that the installed contactor satisfies a same ingress protection (IP) rating as the set of batteries; and
    wherein coordination is performed by sequencing the contactor's actuation relative to a set of other contactors, the sequence causing a lifetime of one or more of the contactors to lengthen.

* * * * *